US011435938B2

(12) United States Patent
Reineke et al.

(10) Patent No.: US 11,435,938 B2
(45) Date of Patent: Sep. 6, 2022

(54) SYSTEM AND METHOD FOR GENERATING ASSET MAPS

(71) Applicant: EMC IP Holding Company LLC, Hopkinton, MA (US)

(72) Inventors: Nicole Reineke, Northborough, MA (US); James Robert King, Norwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/713,694

(22) Filed: Dec. 13, 2019

(65) Prior Publication Data

US 2021/0181971 A1 Jun. 17, 2021

(51) Int. Cl.
| | |
|---|---|
| *H04L 12/24* | (2006.01) |
| *G06F 21/60* | (2013.01) |
| *H04L 29/06* | (2006.01) |
| *G01S 5/00* | (2006.01) |
| *G06F 3/06* | (2006.01) |
| *G01S 17/08* | (2006.01) |
| *H04L 67/1097* | (2022.01) |
| *G01S 17/89* | (2020.01) |

(52) U.S. Cl.
CPC .......... *G06F 3/0653* (2013.01); *G01S 17/08* (2013.01); *G01S 17/89* (2013.01); *G06F 3/0604* (2013.01); *G06F 3/067* (2013.01); *H04L 67/1097* (2013.01)

(58) Field of Classification Search
CPC ...... G06F 3/0653; G06F 3/0604; G06F 3/067; G01S 17/08; G01S 17/89; H04L 67/1097
See application file for complete search history.

(56) References Cited

U.S. PATENT DOCUMENTS

| | | | |
|---|---|---|---|
| 10,101,819 B2 | 10/2018 | Trattler et al. | |
| 10,217,185 B1 | 2/2019 | Cabanero | |
| 10,447,546 B1 | 10/2019 | Guo et al. | |
| 10,929,011 B1 | 2/2021 | Reineke et al. | |
| 2005/0156715 A1* | 7/2005 | Zou | B60R 25/33 340/8.1 |
| 2006/0129691 A1* | 6/2006 | Coffee | H04L 67/02 709/230 |
| 2007/0043860 A1 | 2/2007 | Pabari | |
| 2008/0086391 A1* | 4/2008 | Maynard | G06Q 10/00 705/28 |

(Continued)

OTHER PUBLICATIONS

Washington University in St Louis; "Enabling 'internet of photonic things' with miniature sensors"; ;ScienceDaily Sep. 12, 2018. (www.sciencedaily.com/releases/2018/09/180912144403.htm).

*Primary Examiner* — Christopher B Robinson
(74) *Attorney, Agent, or Firm* — Chamberlain, Hrdlicka, White, Williams & Aughtry

(57) ABSTRACT

An asset mapper for managing a deployment includes a storage and a map manager. The storage stores an asset map of the deployment. The map manager obtains a client oriented location request regarding the deployment for a client; in response to obtaining the client oriented location request: obtains location information of the client with respect to an asset of the deployment using a positioning sensor of the client; generates a client oriented asset map of the deployment using the location information and the asset map of the deployment; and performs an action set using the client oriented asset map to service the client oriented location request.

11 Claims, 17 Drawing Sheets

(56) References Cited

U.S. PATENT DOCUMENTS

| | | | |
|---|---|---|---|
| 2009/0216438 A1* | 8/2009 | Shafer | G01C 21/206 |
| | | | 701/414 |
| 2013/0218890 A1* | 8/2013 | Fernandes | G06F 16/29 |
| | | | 707/736 |
| 2014/0372907 A1 | 12/2014 | Lee et al. | |
| 2015/0304169 A1* | 10/2015 | Milman | H04L 41/0823 |
| | | | 709/220 |
| 2016/0103494 A1 | 4/2016 | Zehler et al. | |
| 2016/0343093 A1 | 11/2016 | Riland et al. | |
| 2017/0024378 A1 | 1/2017 | Sharma et al. | |
| 2017/0066459 A1* | 3/2017 | Singh | G06V 10/751 |
| 2017/0109422 A1* | 4/2017 | Satkunarajah | G06F 16/258 |
| 2017/0374519 A1 | 12/2017 | Hewitt et al. | |
| 2018/0090992 A1* | 3/2018 | Shrivastava | H02J 50/20 |
| 2018/0129276 A1 | 5/2018 | Nguyen et al. | |
| 2018/0270120 A1 | 9/2018 | Tung et al. | |
| 2019/0108756 A1 | 4/2019 | Gillingham | |
| 2019/0332374 A1 | 10/2019 | Harner | |
| 2020/0090109 A1 | 3/2020 | Dozortsev et al. | |
| 2020/0351345 A1 | 11/2020 | Bansod | |
| 2021/0004757 A1 | 1/2021 | Serhan | |

* cited by examiner

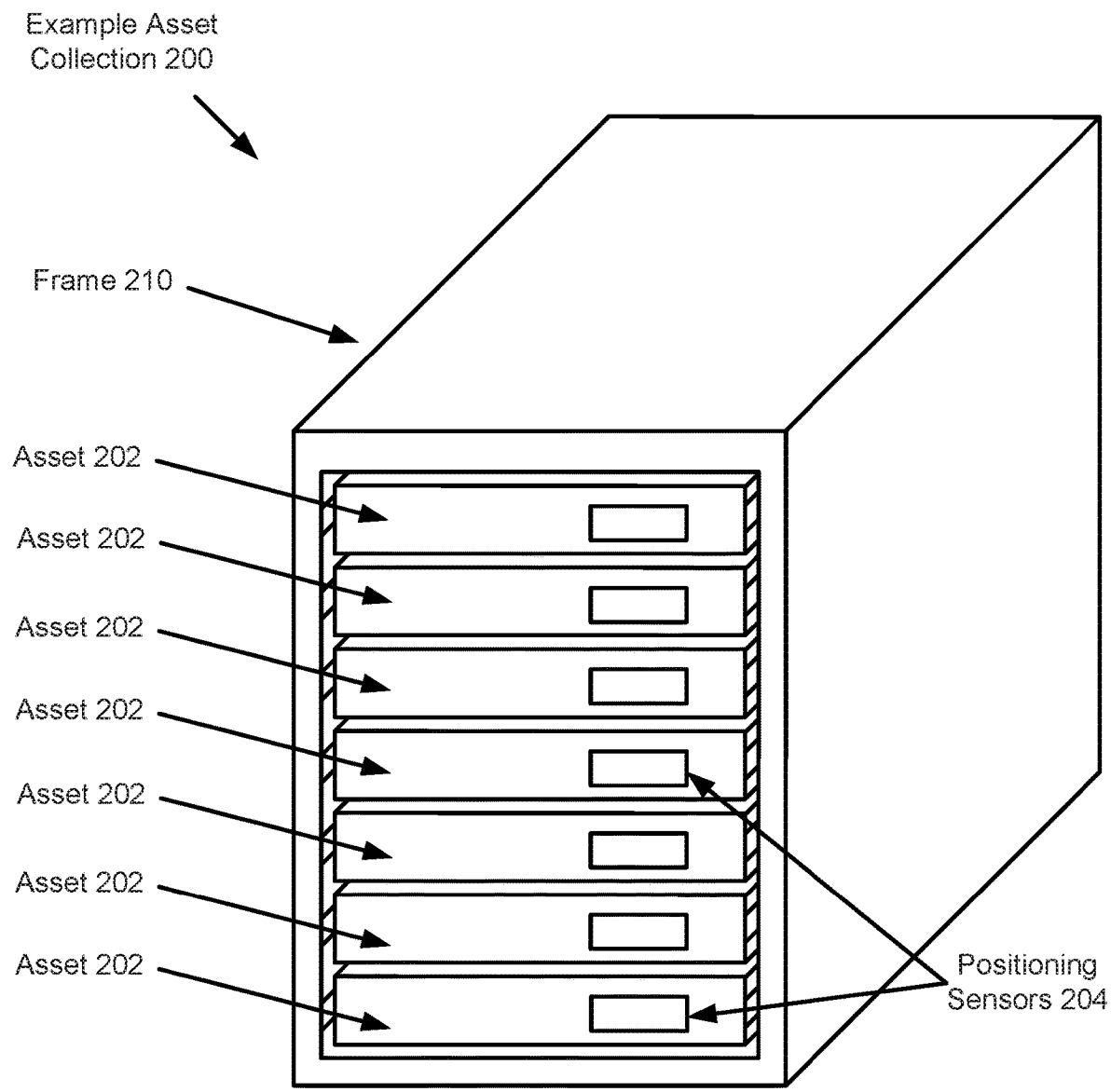
FIG. 2.1

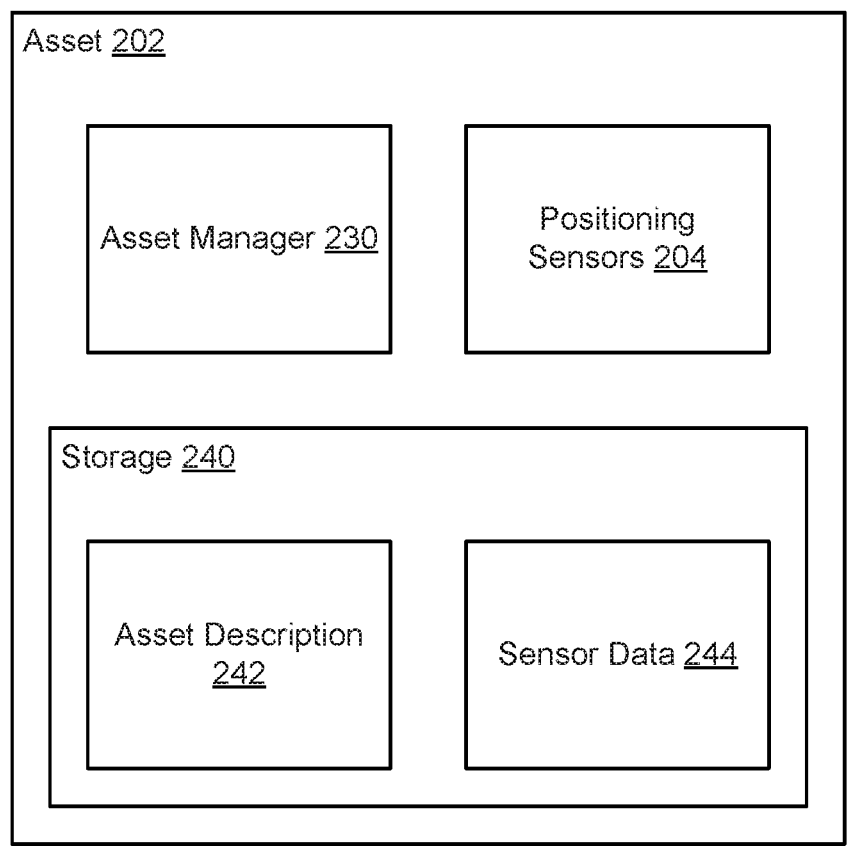
FIG. 2.2

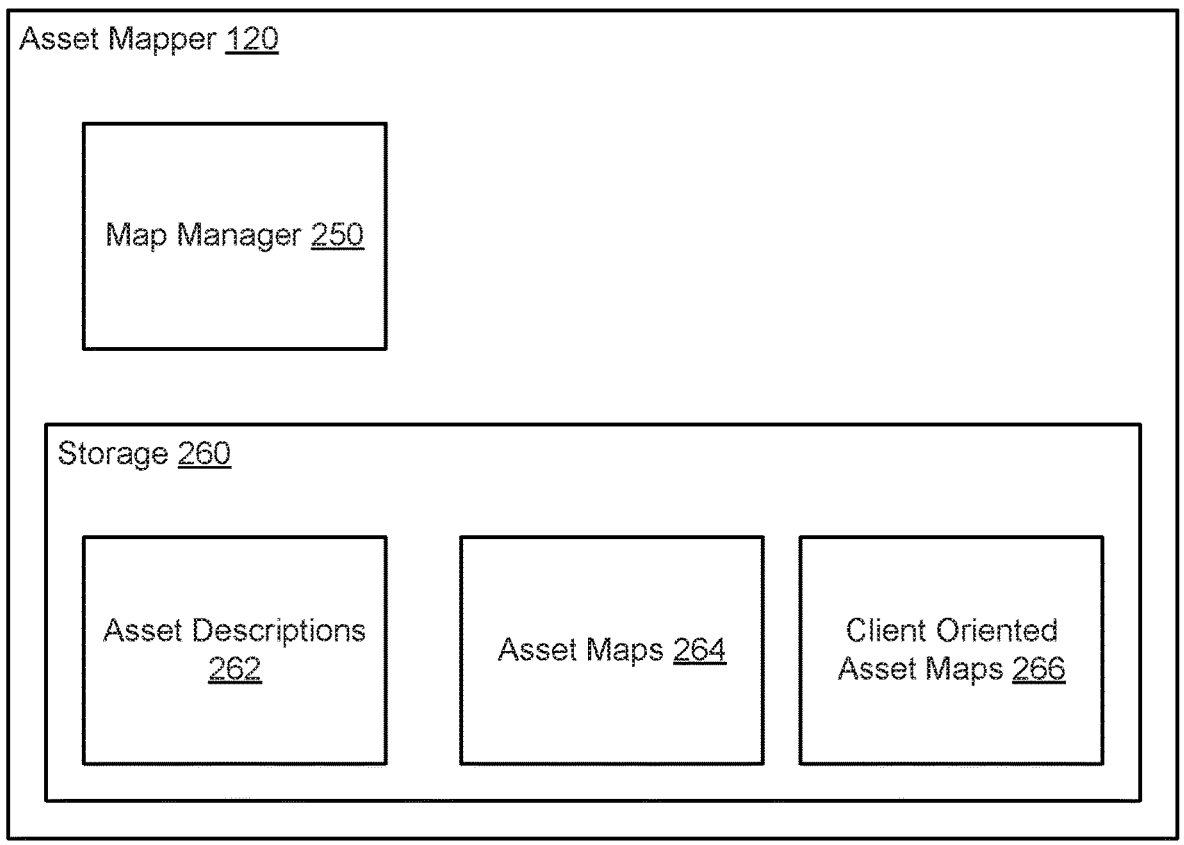
FIG. 2.3

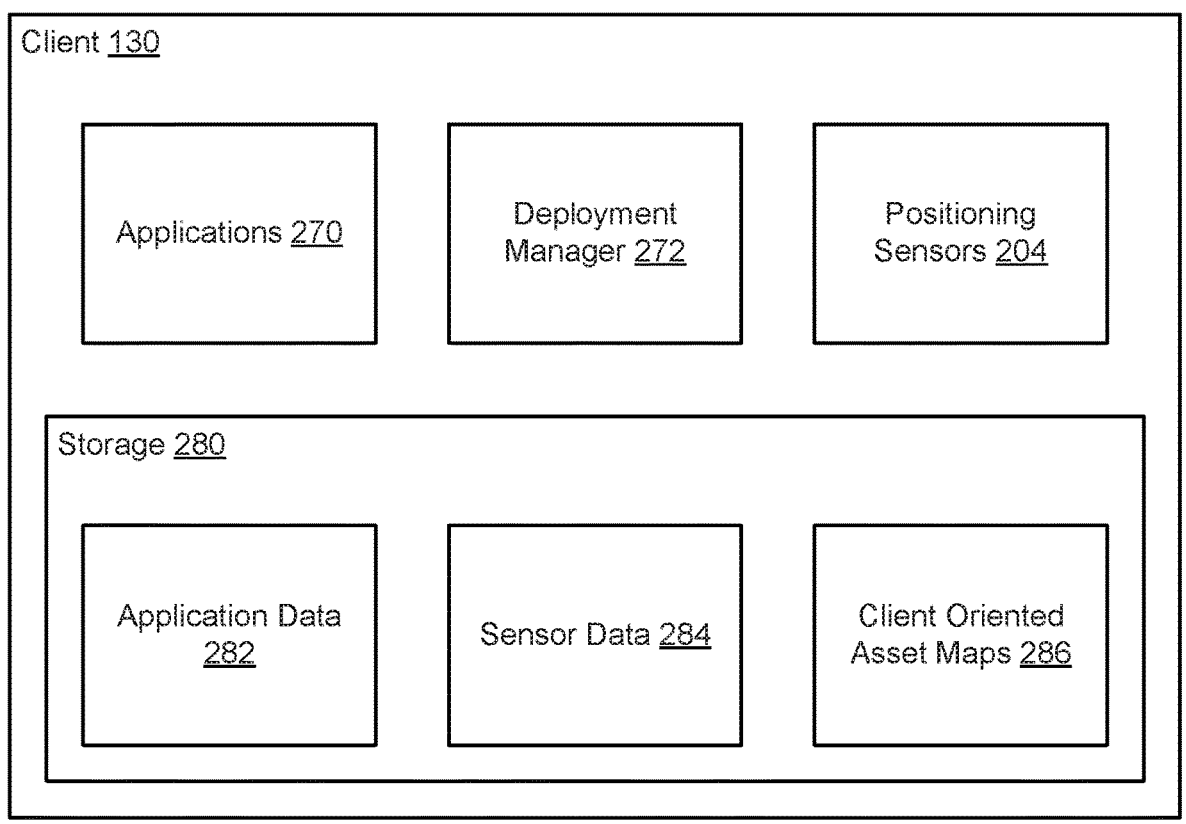
FIG. 2.4

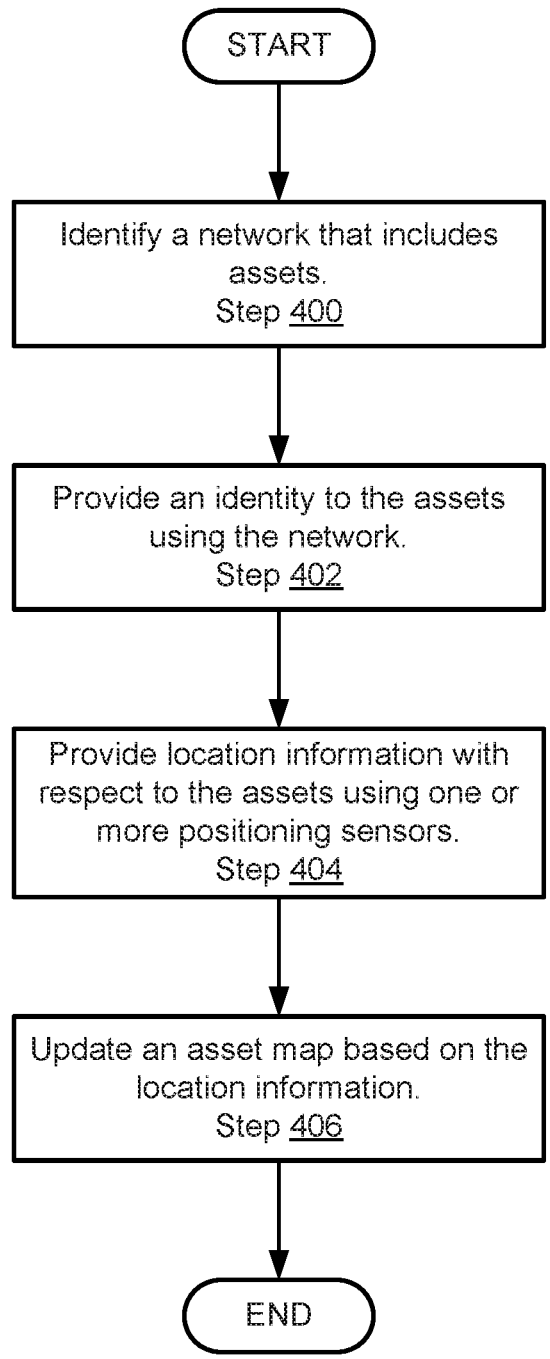
FIG. 4.1

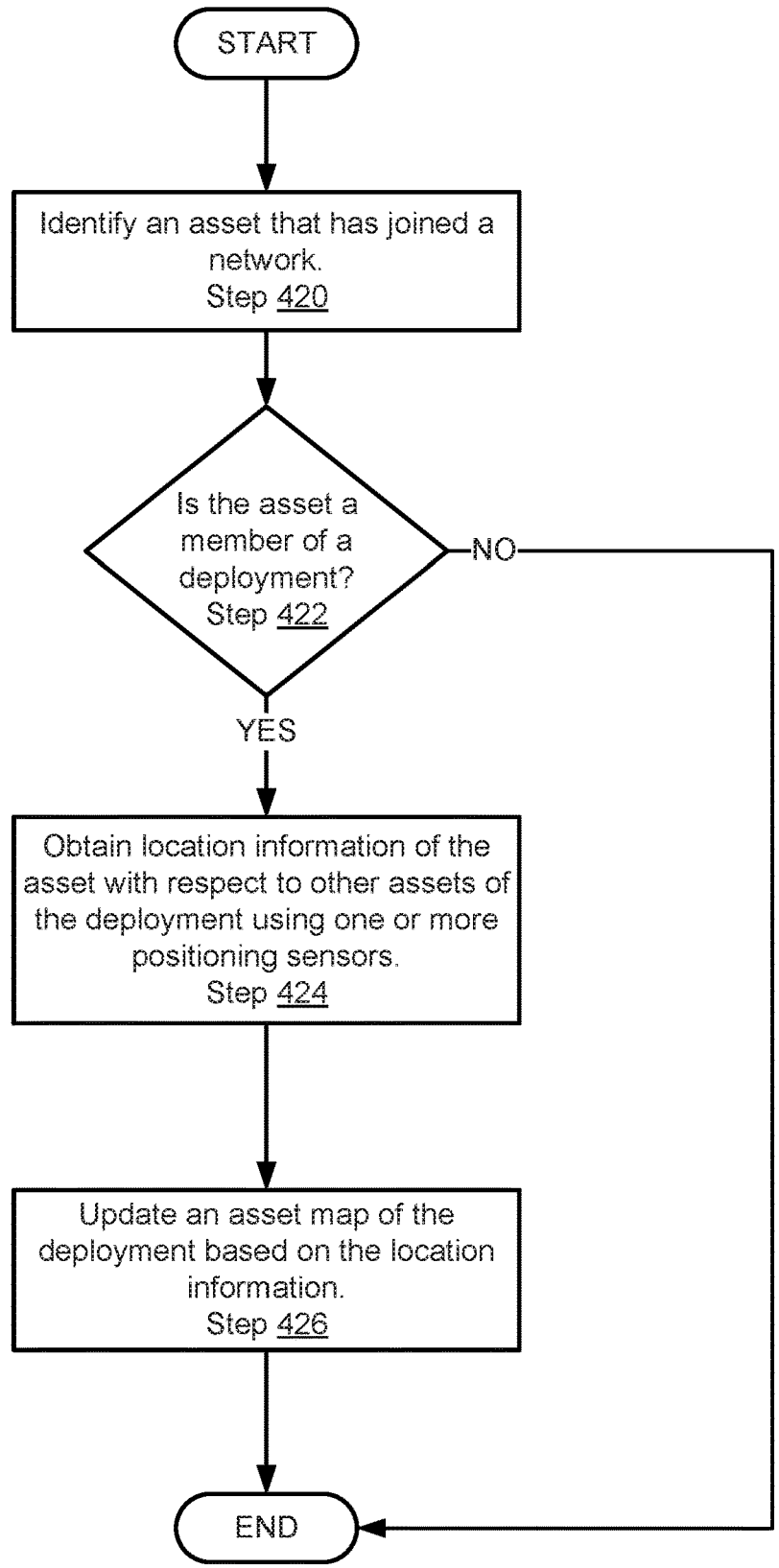
FIG. 4.2

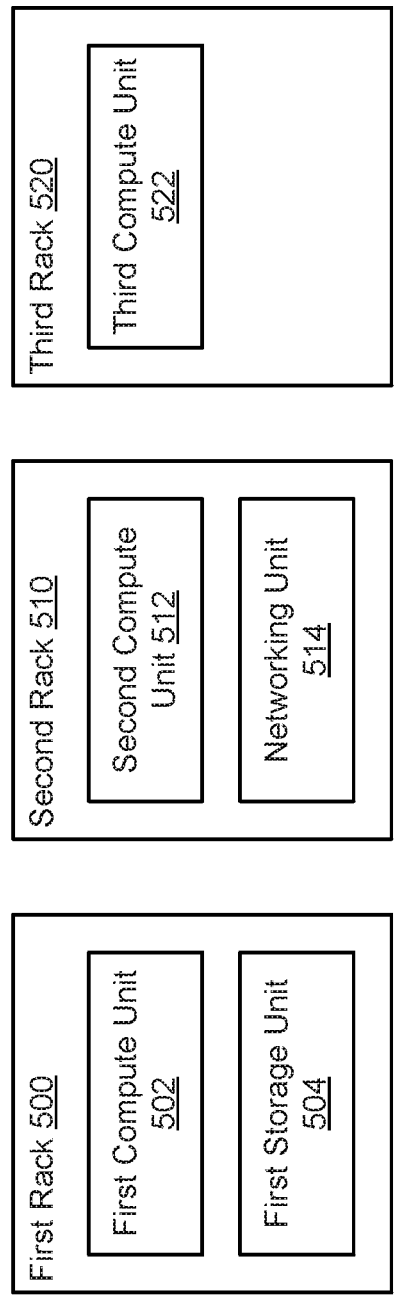
FIG. 5.1

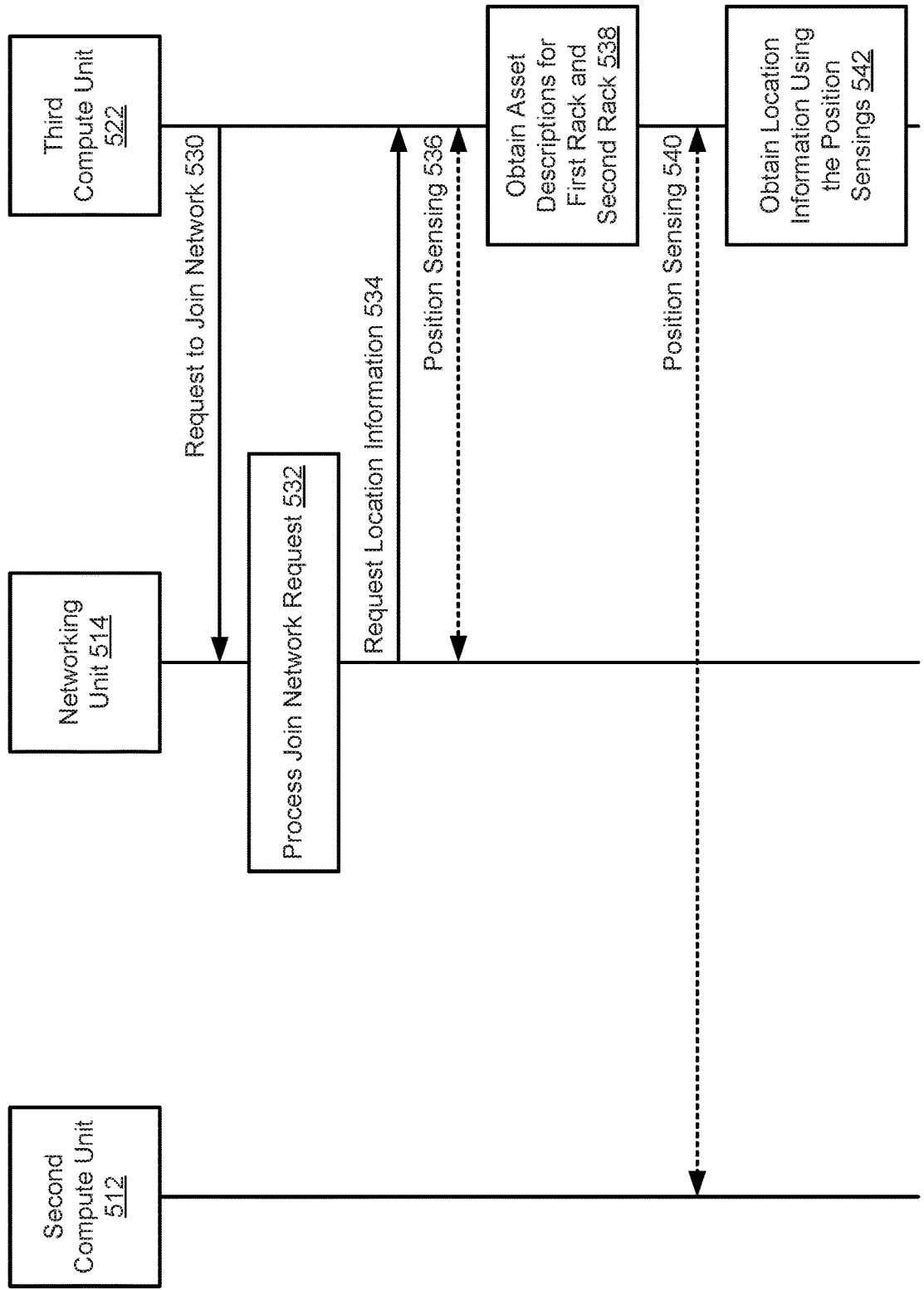
FIG. 5.2

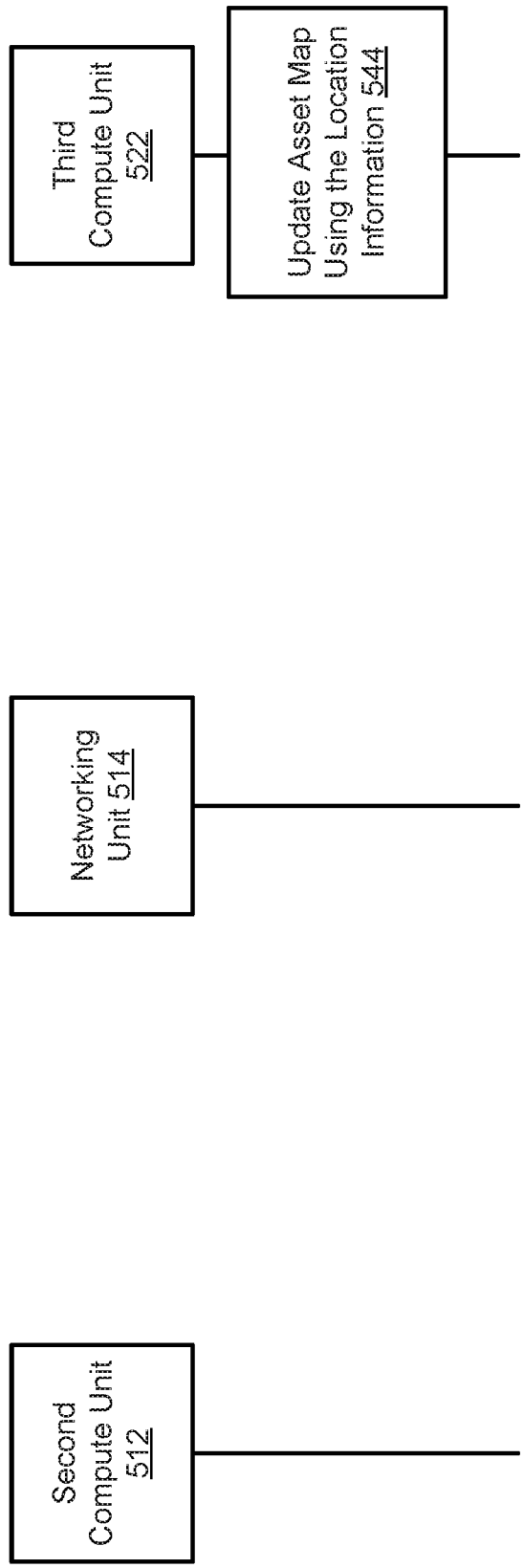

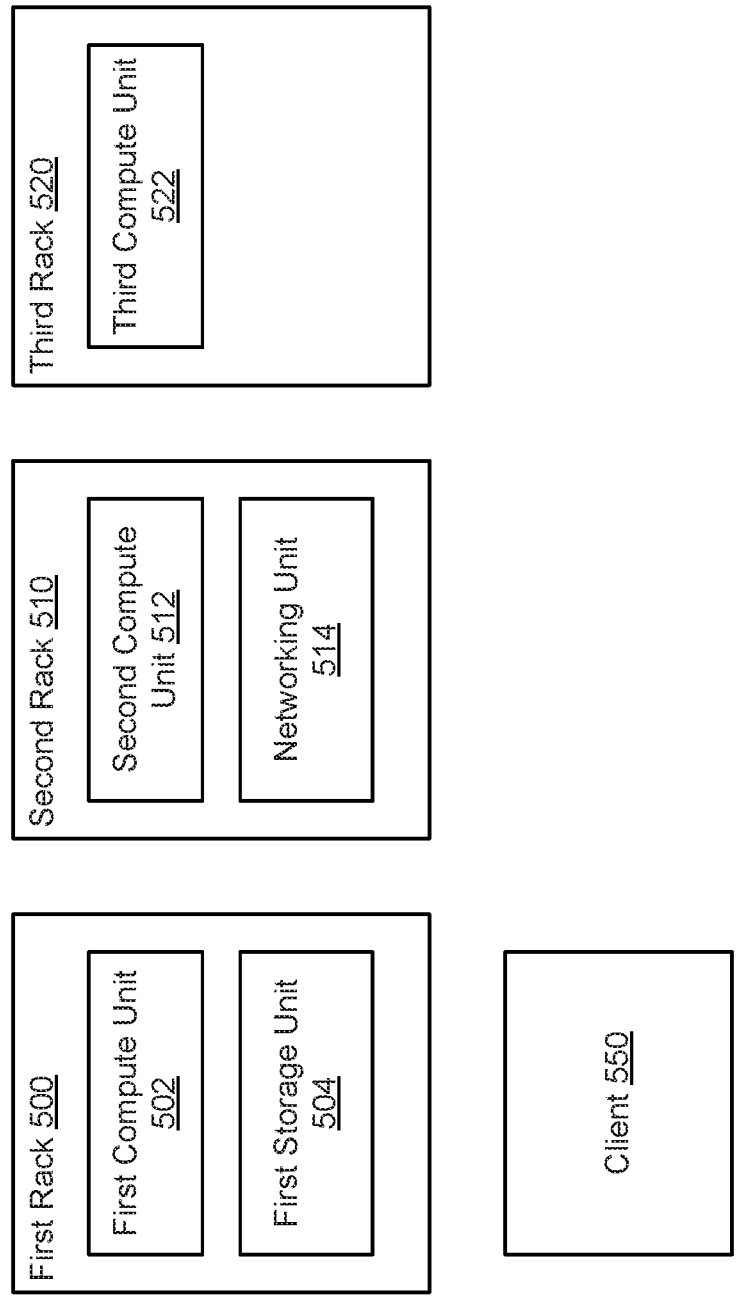
FIG. 5.4

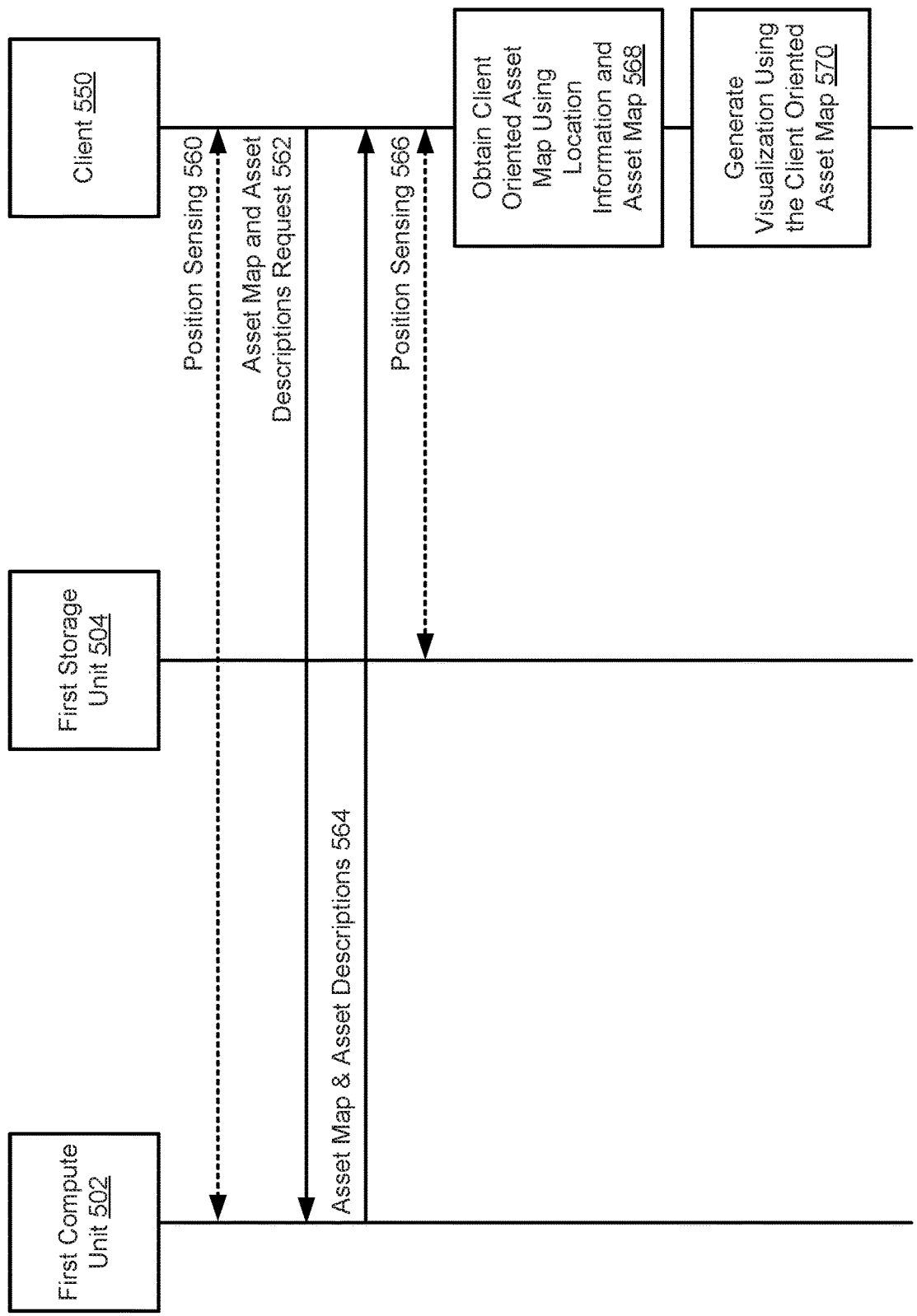
FIG. 5.5

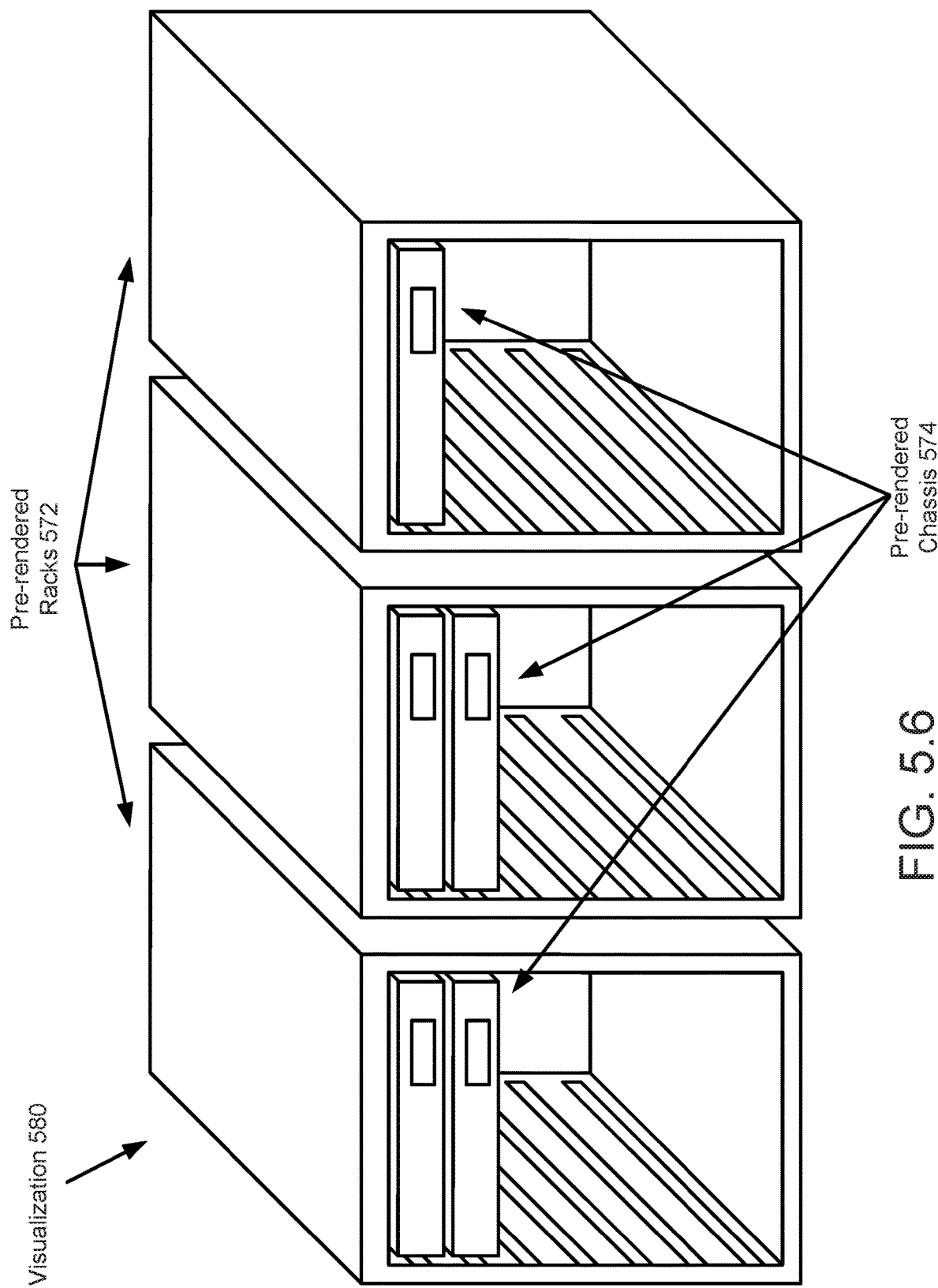

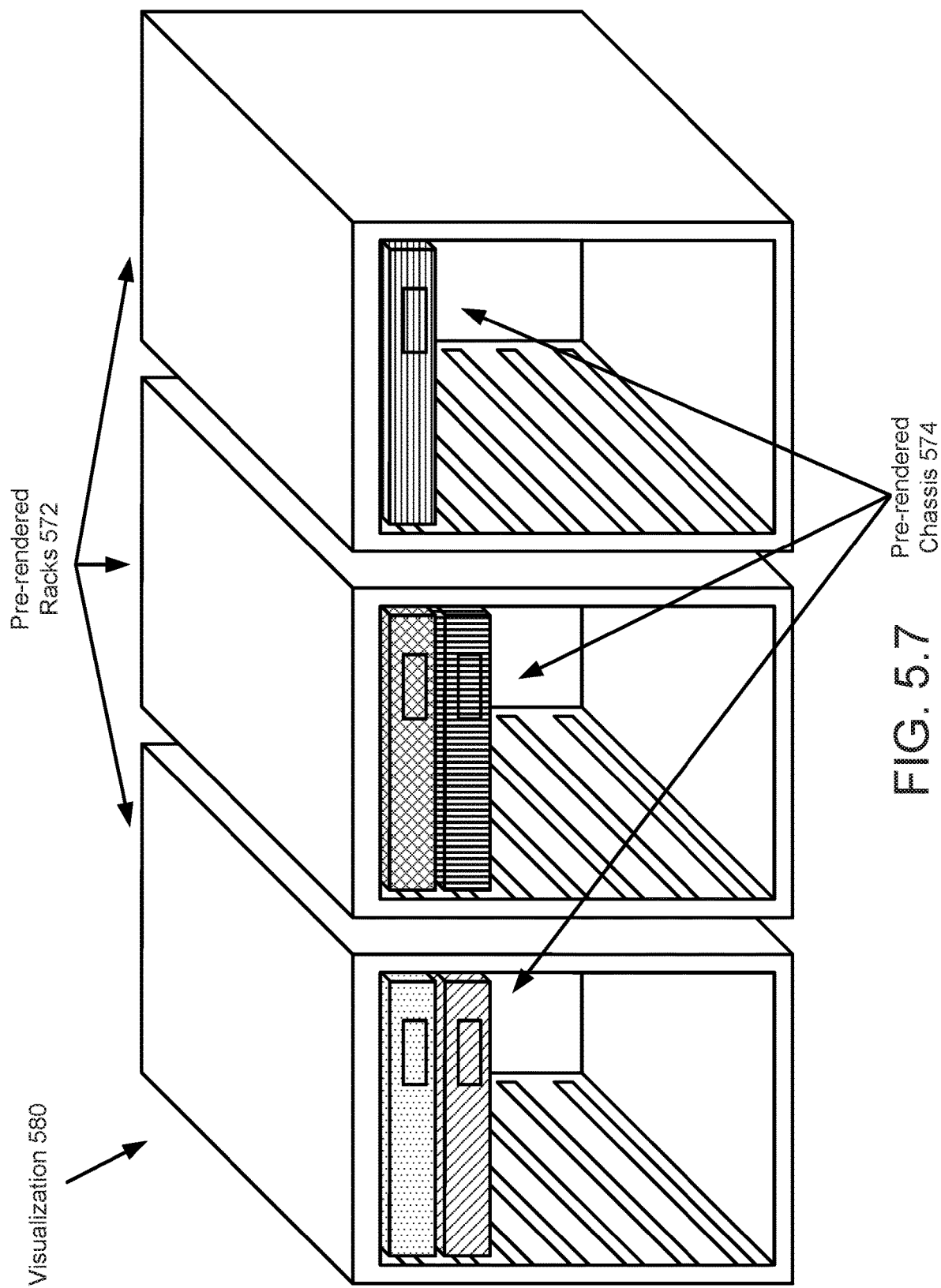
FIG. 5.7

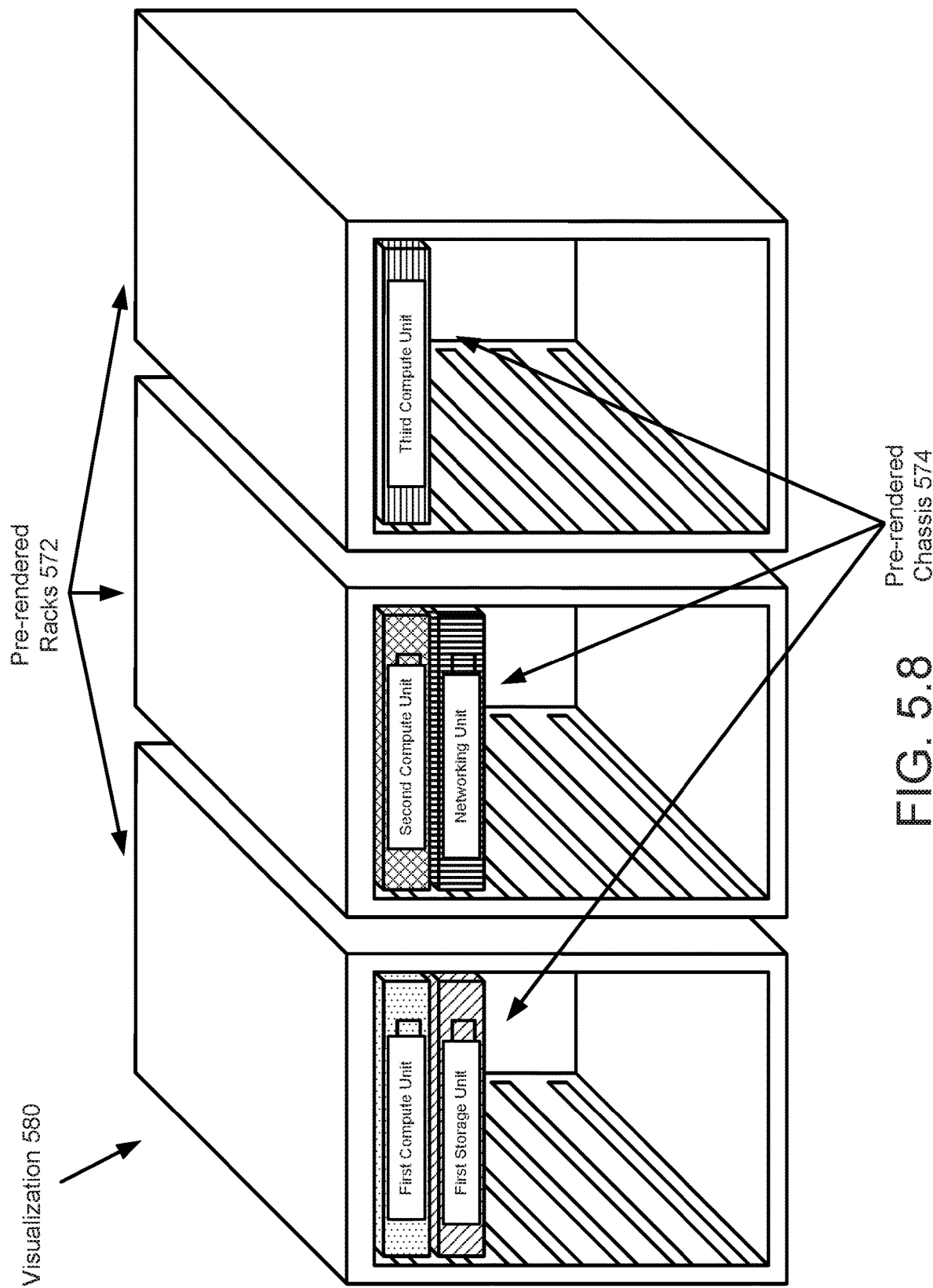
FIG. 5.8

SYSTEM AND METHOD FOR GENERATING ASSET MAPS

BACKGROUND

Devices may generate information based on existing information. For example, devices may obtain information and derive information based on the obtained information. To obtain information, devices may be able to communicate with other devices. The communications between the devices may be through any means.

SUMMARY

In one aspect, an asset mapper for managing a deployment in accordance with one or more embodiments of the invention includes a storage and a map manager. The storage stores an asset map of the deployment. The map manager obtains a client oriented location request regarding the deployment for a client; in response to obtaining the client oriented location request: obtains location information of the client with respect to an asset of the deployment using a positioning sensor of the client; generates a client oriented asset map of the deployment using the location information and the asset map of the deployment; and performs an action set using the client oriented asset map to service the client oriented location request.

In one aspect, a method for managing a deployment in accordance with one or more embodiments of the invention includes obtaining a client oriented location request regarding the deployment for a client; in response to obtaining the client oriented location request: obtaining location information of the client with respect to an asset of the deployment using a positioning sensor of the client; generating a client oriented asset map of the deployment using the location information and an asset map of the deployment; and performing an action set using the client oriented asset map to service the client oriented location request.

In one aspect, non-transitory computer readable medium in accordance with one or more embodiments of the invention includes computer readable program code, which when executed by a computer processor enables the computer processor to perform a method for managing a deployment. The method includes obtaining a client oriented location request regarding the deployment for a client; in response to obtaining the client oriented location request: obtaining location information of the client with respect to an asset of the deployment using a positioning sensor of the client; generating a client oriented asset map of the deployment using the location information and an asset map of the deployment; and performing an action set using the client oriented asset map to service the client oriented location request.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example asset collection in accordance with one or more embodiments of the invention.

FIG. 2.2 shows a diagram of an asset in accordance with one or more embodiments of the invention.

FIG. 2.3 shows a diagram of an asset mapper in accordance with one or more embodiments of the invention.

FIG. 2.4 shows a diagram of a client in accordance with one or more embodiments of the invention.

FIG. 4.1 shows a flowchart of a first method of maintaining an asset map when an asset is added to a deployment in accordance with one or more embodiments of the invention.

FIG. 4.2 shows a flowchart of a second method of maintaining an asset map when an asset is added to a deployment in accordance with one or more embodiments of the invention.

FIG. 5.1 shows a diagram of an example system at a first point in time.

FIGS. 5.2-5.3 show diagrams of interactions between and actions performed by components of the example system of FIG. 5.1 over time.

FIG. 5.4 shows a diagram of the example system of FIG. 5.1 after a client is added to the example system.

FIG. 5.5 shows a diagram of interactions between and actions performed by components of the example system of FIG. 5.4 over time.

FIGS. 5.6-5.8 show diagrams of a visualization as features are added to the visualization.

DETAILED DESCRIPTION

Figure 1:
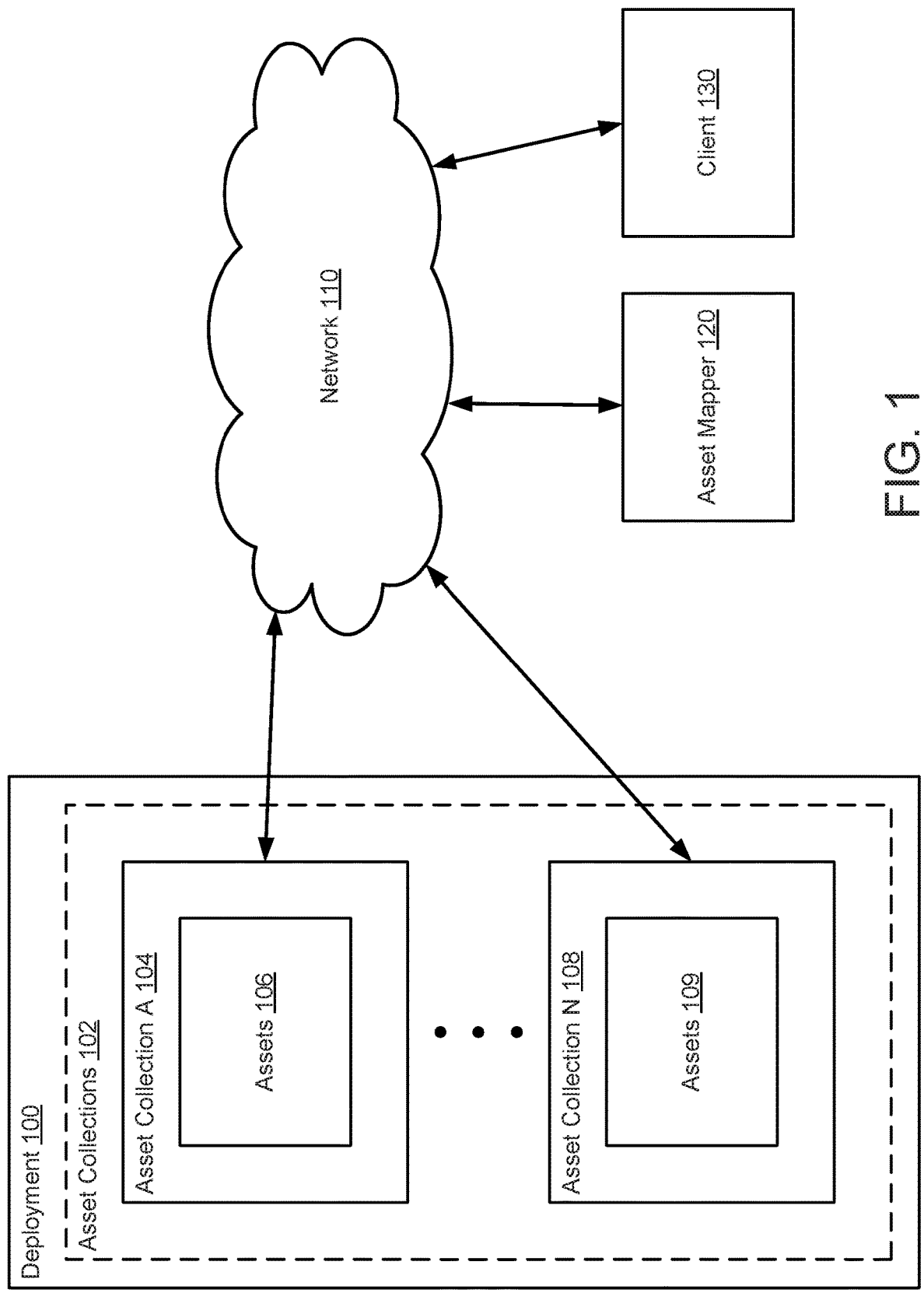
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for managing deployments. A deployment may include any number of assets. An asset may be a collection of hardware devices that hosts applications and/or stores data. The assets of the deployment may cooperate to provide functionalities of the deployment.

Overtime, it may be necessary to identify assets of the deployment. For example, to replace components of an asset that have failed. However, due to the large number of assets of a deployment, changing topology of the deployment, and limited signage or other indicators of the identities of assets of the deployment, identifying any particular asset of a deployment may be challenging.

Embodiments of the invention may provide a method for dynamically generating maps of deployments that are oriented with respect to an individual tasked with identifying an asset of the deployment. To do so, the assets of the deployment and client utilized by the individual may include positioning sensors adapted to identify the relative position, orientation, and/or other telemetry information regarding the assets and the client.

The client oriented asset maps may be used, for example, to generate visualization of the deployment from the perspective of the individual tasked with identifying an asset. The visualization may be displayed to the individual via the client which may reduce the cognitive burden on the individual to identify the asset. For example, the individual may compare the displayed visualization to the view of the individual to identify the particular asset which the individual is tasked with identifying.

In one or more embodiments of the invention, the positioning sensors are implemented as photonic devices that utilize electromagnetic radiation in the optical and/or near optical frequency bands to sense the position, orientation, and/or other telemetry information regarding other positioning sensors. By including one or more photonic sensors as part of the assets and/or the client, the relative position, orientation, and/or other information regarding the aforementioned devices may be obtained without radiating electromagnetic radiation that may interfere with the operation of the deployment.

Additionally, because the assets may radiate electromagnetic radiation at lower frequency bands (e.g., lower than near optical frequency bands), the photonic sensors may be insensitive to such electromagnetic radiation. In contrast, other types of sensors that may utilize lower frequency bands may be highly susceptible to such electromagnetic radiation. Consequently, the accuracy of the sensed position, orientation, etc. via photonic sensors in a deployment environment may be substantially better when compared to using other types of sensors.

FIG. 1 shows a system in accordance with one or more embodiments of the invention. The system may include a deployment (100) that provides computer implemented services. The computer implemented services may include, for example, database services, data storage services, electronic communications services, and/or other types of services that may be implemented using computing devices.

To provide the computer implemented services, the deployment (100) may utilize computing resources provided by hardware devices. The computing resources may include, for example, processing resources, storage resources, memory resources, and/or communications resources provided by the hardware devices.

The hardware devices of the deployment may be logically and/or physically divided into assets (106, 109). An asset may include a portion of the hardware devices of the deployment (100) and an enclosure for storing the portion of the hardware devices. An enclosure may be, for example, a rack mountable chassis or another type of form factor compliant enclosure. Different assets may include different types and/or number of hardware devices. Consequently, different assets may provide different types and quantities of computing resources.

For example, an asset may include a computing device disposed in a chassis. The computing device may include a processor, memory module, storage device, communications processor, and/or other types of hardware devices. For additional details regarding computing devices, refer to FIG. 6. The aforementioned asset may provide a combination of processing resources, memory resources, storage resources, etc. However, other assets may be adapted to only provide a single type of computing resources, e.g., storage resources, memory resources, etc., by including only a limited number and type of hardware devices.

To enable the assets to be arranged with respect to each other, the assets of the deployment (100) may be arranged into asset collections (102). The assets may be arranged into any number of asset collections (e.g., 104, 108). Different asset collections may include different numbers and/or types of assets.

An asset collection (e.g., 104, 108) may include any number of assets arranged in a predetermined manner. For example, an asset collection may include a rack used to arrange a number of assets having rack mountable chassis into a predetermined arrangement (e.g., vertically stacked). The asset collections (102) may use devices other than racks to arrange the assets without departing from the invention. For additional details regarding asset collections, refer to FIGS. 2.1-2.2.

The asset collections (102) may be disposed at predetermined locations within the deployment (100). For example, the asset collections may be arranged into rows or other organizational schemes.

Due to the number of assets (106), the number of hardware devices of each of the assets, and the arrangement of the assets as part of assets collections (102), it may be time consuming and/or difficult to identify particular assets of a deployment. For example, consider a scenario where a deployment includes 100 asset collections implemented as racks and each of the racks includes 12 assets implemented as rack mount chassis disposed in the racks of the asset collections. In such a scenario, when a hardware failure occurs, it may be difficult to identify any particular asset within the deployment due to the uniform physical appearance of the assets and asset collections which greatly complicates remedying of the hardware failure.

Embodiments of the invention may provide systems and methods for facilitating identification of assets of a deployment. Specifically, embodiments of the invention may provide a method for dynamically mapping the location of assets with respect to the location and/or orientation of an observer. By mapping the location of the assets with respect to the location and/or orientation of the observer, the cognitive burden placed on an observer for identifying the location of a particular asset may be greatly reduced. For example, by mapping the locations of the assets with respect to the observer, the observer may more intuitively identify the locations of the assets. In one or more embodiments of the invention, maps of the assets of a deployment are referred to as an asset map and an asset map that is oriented with respect to an observer is referred to as a client oriented asset map.

By reducing the cognitive burden on users for identifying assets of a deployment using a client oriented asset map of the deployment, the accuracy of asset identification may be improved thereby improving the uptime and/or performance of the deployment (100). For example, by improving the accuracy of identifying an asset, the time required to resolve hardware, software, and/or other types of issues that may impact the performance of the deployment (100) may be reduced.

To provide the aforementioned functionality, a system in accordance with embodiments of the invention may include assets (106) that identify their position, orientation, and/or other telemetry information with respect to other assets. To do so, each of the assets may include positioning sensors that may be used to identify the relative position of an asset with respect to the position of another asset. For additional details regarding assets, refer to FIGS. 2.1-2.2.

The position, orientation, and/or other telemetry information may be used to generate and/or maintain a map of the assets (e.g., an asset map) of the deployment (100). The map of the deployment (100) may specify, for example, the relative position of each of the assets with respect to the other assets. The map of the assets may be generated and/or maintained by an asset mapper (120).

The map of the assets of the deployment (100) may also be generated using descriptions of the arrangement of the assets of the deployment. For example, when a deployment is deployed, a description of the assets included in each of the asset collections may be generated. The aforementioned description of the assets of the deployment (100) may be used to improve the quality (e.g., accuracy, precision, etc.) of asset maps and/or determinations regarding the relative position of an observer, discussed below. For example, the description of the assets may be used to determine whether determinations regarding the location, orientation, and/or other telemetry information are likely to be accurate. In other words, whether the determinations regarding the positions and/or orientations of the assets are consistent with the description of the assets.

For example, due to the arrangement of assets as part of an asset collection, a description of the assets may specify that the assets of an asset collection should be similarly positioned with respect to a particular asset (e.g., an asset facing a rack of assets). Accordingly, if the determinations regarding the locations and/or orientations of the assets indicates that the assets of the asset collections are not located in the same relative position with respect to an asset, the determinations regarding the locations and/or orientations of the assets may be determined to be inaccurate.

To dynamically map the location and/or orientation of an observer with respect to the assets of the deployment (100), an observer (e.g., a person such as a technician or deployment administrator) may utilize a client (130). A client (130) may be a device (physical or virtual) operated by an observer (e.g., an administrator, a technician, etc.) that desires to identify particular assets of a deployment. The client (130) may identify the position, orientation, and/or other telemetry information of the user of the client (130) (e.g., an observer) with respect to one or more of the assets of the deployment (100). To do so, the client (130) may include positioning sensors that may be used to identify the relative position of the client (130) with respect to one or more of the assets (106).

The client (130) may provide the aforementioned telemetry information to other entities or use the telemetry information to otherwise obtain a client oriented asset map of the deployment. Using the client oriented asset map, the client (130) may provide information to the observer that enables the observer to more easily identify assets of the deployment. For example, the client (130) may generate visualizations regarding the assets of the deployment or other types of displays or interactive visualizations which the observer may utilize to identify assets or otherwise better understand the topology of the deployment. For additional details regarding the client (130), refer to FIG. 2.4.

As noted above, the position, orientation, and/or other telemetry information of the client (130) with respect to the assets (106) may be used to dynamically generate and/or maintain a map of the assets of the deployment (100) with respect to the position and/or orientation of the observer. In other words, the telemetry may be used to generate a client oriented asset map. The map of the assets relative to the observer may be generated and/or maintained by the asset mapper (120). Similarly, the asset mapper (120) may maintain an asset map of the deployment using similar information (e.g., location/orientation/other telemetry information) regarding the assets of the deployment. For additional details regarding the asset mapper (120), refer to FIG. 2.3.

The components of the system of FIG. 1 may be operably connected to each other and/or other entities via any combination of wired and/or wireless network. For example, the aforementioned components may each be operably connected to a network (110) that facilitates communications between these components.

The deployment (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the deployment (100) described in this application and/or all, or a portion, of the methods illustrated in FIGS. 3-4.2. The deployment (100) may be implemented using other types of computing devices without departing from the invention. For additional details regarding computing devices, refer to FIG. 6.

The deployment (100) may be implemented using logical devices without departing from the invention. For example, the deployment (100) may be implemented using virtual machines that utilize computing resources of any number of physical computing devices (e.g., refer to FIG. 6) to provide their respective functionalities. The deployment (100) may be implemented using other types of logical devices without departing from the invention.

In one or more embodiments of the invention, the deployment (100) provides any number of computer implemented services. The computer implemented services may include, for example, file storage services, database services, electronic communication services, etc. The deployment (100) may provide other types of computer implemented services without departing from the invention. Each of the assets (e.g., 106, 109) of the deployment (100) may provide similar and/or different computer implemented services.

The asset mapper (120) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the asset mapper (120) described in this application and/or all, or a portion, of the methods illustrated in FIGS. 3-4.2. The asset mapper (120) may be implemented using other types of computing devices without departing from the invention. For additional details regarding computing devices, refer to FIG. 6.

The asset mapper (120) may be implemented using logical devices without departing from the invention. For example, the asset mapper (120) may be implemented using virtual machines that utilize computing resources of any number of physical computing devices (e.g., refer to FIG. 6) to provide their respective functionalities. The asset mapper (120) may be implemented using other types of logical devices without departing from the invention.

While illustrated as a separate entity, the functionality of the asset mapper (120) may be implemented via the client (130) and/or the assets (106, 109) of the deployment (100). For example, the asset mapper (120) may be implemented as a distributed application that executes using the computing resources of the other components of the system of FIG. 1 and/or computing resources of other entities not illustrated in FIG. 1.

In one or more embodiments of the invention, the asset mapper (120) provides mapping services. Mapping services may include generating of asset maps of deployments and/or client oriented asset maps and/or providing asset maps and/or client oriented asset maps. To generate such maps, the asset mapper (120) may obtain location information (e.g., relative position, orientation, and/or other telemetry information) regarding one or more of the assets (106, 109) and/or the client (130) with respect to each other. The aforementioned information may be utilized to generate the asset maps and/or client oriented asset maps.

The client (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the client (130) described in this application and/or all, or a portion, of the methods illustrated in FIGS. 3-4.2. The client (130) may be implemented using other types of computing devices without departing from the invention. For additional details regarding computing devices, refer to FIG. 6.

The client (130) may be implemented using logical devices without departing from the invention. For example, the client (130) may be implemented using virtual machines that utilize computing resources of any number of physical computing devices (e.g., refer to FIG. 6) to provide their respective functionalities. The client (130) may be implemented using other types of logical devices without departing from the invention.

In one or more embodiments of the invention, the client (130) provides deployment information to observers. The deployment information may be provided to the client (130) through visualizations of the deployment (100) or other types of graphical user interfaces that enable observers to more easily identify assets of the deployment. For example, the client (130) may generate a graphical representation of the deployment keyed to the position and/or orientation of the client (130) with respect to the deployment, highlight the different assets within the deployment, and/or illustrate other types of information regarding the deployment.

While the system is illustrated in FIG. 1 as including a limited number of specific components, a system in accordance with embodiments of the invention may include additional, fewer, and/or different components from those illustrated in FIG. 1 and/or discussed above without departing from the invention.

As discussed above, the assets of the deployment of FIG. 1 may be arranged into asset collections. FIG. 2.1 shows a diagram of an example asset collection (200) in accordance with one or more embodiments of the invention. As discussed above, an asset collection may be a physical arrangement of assets (e.g., 202).

To arrange the assets (e.g., 202) of the example asset collection (200) with respect to each other, the example asset collection (200) may include a structural element such as, for example, a frame (210). A frame (210) may be a physical structure adapted to position and/or orient multiple assets within a predetermined space. For example, the frame (210) maybe implemented as a rack mount structure adapted to receive the chassis of the assets. When the assets are received by the frame (210), the assets (e.g., 202) may be reversibly locked in place with respect to each other.

For example, as illustrated in FIG. 2.1, the frame (210) may enable the assets (e.g., 202) to be vertically stacked with respect to the other assets (202). By doing so, the assets (e.g., 202) may be packed tightly with respect to each other and/or positioned and/or oriented in a predetermined with respect to each other. For example, as seen in FIG. 2.1, the assets may be stacked with respect to each other and orient a predetermined face of each asset.

The oriented predetermined face of each asset may include, for example, on or more positioning sensors (204). The positioning sensors (204) of the assets (e.g., 202) may enable the assets to ascertain the position, orientation, and/or other telemetry information with respect to each other.

In one or more embodiments of the invention, the positioning sensors are implemented as photonic sensors. A photonic sensor may be a device that utilizes electromagnetic radiation in an optical or near optical band to ascertain information regarding the environment in which the photonic sensor resides.

For example, a photonic sensor may include optical resonators, optical transceivers, data processors, and/or other types of hardware devices that are able to sense the position, orientation, and/or other telemetry information regarding other photonic sensors in the vicinity of the photonic sensor. By operating in an optical or near optical frequency band, the photonic sensor may obtain telemetry information without utilizing electromagnetic radiation in a frequency band used by the system of FIG. 1 for communication purposes. For example, the system of FIG. 1 may utilize one or more wireless network that operates between 1 Megahertz and 100 Gigahertz. In contrast, the photonic sensors may operate utilizing electromagnetic radiation having a frequency content above 300 Gigahertz. Consequently, the photonic sensors may be utilized to provide telemetry information without receiving interference due to communication by the system of FIG. 1. Similarly, the photonic sensors may operate without cause interference with communications by the system of FIG. 1.

The positioning sensors (204) of each of the assets (202) may be operably coupled to computing resources of the respective assets. For additional details regarding the computing resources of the respective assets and utilization of the sensor data provided by the positioning sensors (204), refer to FIG. 2.2.

While the example asset collection (200) is illustrated as including a specific number of specific types of assets in a specific orientation, an asset collection in accordance with embodiments of the invention may include different numbers and types of assets, may orient the assets in different manners, and may include additional, fewer, and/or different components from those illustrated in FIG. 2.1 without departing from the invention.

As discussed above, an asset may include computing resources. The aforementioned resources may be used to host logical entities (e.g., programs, virtual entities). FIG. 2.2 shows a diagram of an asset (202) in accordance with one or more embodiments of the invention. The assets (106, 109) of FIG. 1 may be similar to the asset illustrated in FIG. 2.2.

As discussed above, an asset may provide computer implemented services as part of the deployment (100) and may obtain and provide positioning, orientation, and/or other types of telemetry information of the asset with respect to other assets. Additionally, the asset (202) may maintain a description of the asset. For example, the asset description (242) may specify hardware and software components of the asset (202). To provide the aforementioned functionality, the asset (202) may include an asset manager (230), positioning sensors (204), and storage (240). Each of these components of the asset (202) are discussed below.

The asset manager (230) may be implemented using physical and/or logical devices. For example, the asset manager (230) may be implemented using computer readable instructions (e.g., program code) that when executed by the computing resources of the asset (202) give rise to the functionality of the asset manager (230). In another example, the asset manager (230) may be implemented using special purpose hardware devices such as, for example, programmable gate arrays, application specific integrated circuit, or another type of hardware device that provides the functionality of the asset manager (230) by including circuitry adapted to provide the aforementioned functionality. In a still further example, the asset manager (230) may be implemented using a combination of computer readable instructions (e.g., program code) and special purpose hardware devices.

The asset manager (230) may manage the operation of the asset (202). To manage the operation of the asset (202), the asset manager (230) may obtain data from the positioning sensors (204), validate the obtained data by comparing it to other data obtained from the positioning sensors (204), store the sensor data (244), and provide copies of the sensor data (244) to other entities. When providing the above noted functionality, the asset (202) may cooperate with other entities of the system of FIG. 1 to provide, for example, the functionality of the deployment, the asset mapper, and/or the client.

Figure 3:
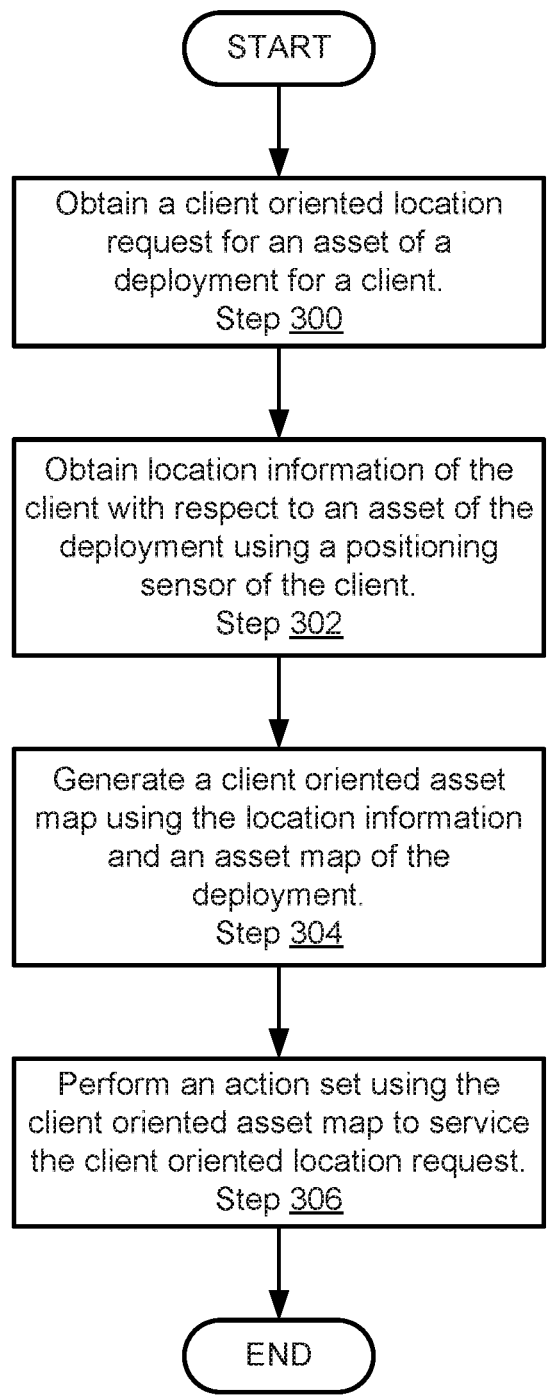
FIG. 3 shows a flowchart of a method of managing a deployment in accordance with one or more embodiments of the invention.

When providing the above noted functionality, the asset manager (230) may perform all, or a portion, of the methods illustrated in FIGS. 3-4.2.

The positioning sensors (204) may be physical devices that provide sensing services. Sensing services may include (i) obtaining sensor data (e.g., measurements) and (ii) providing the sensor data to the asset manager (230) and/or other entities.

In one or more embodiments of the invention, the positioning sensors (204) are implemented as photonic sensors (e.g., sensors that utilize electromagnetic radiation at optical and/or near optical frequencies) that are adapted to identify the location, orientation, and/or other telemetry information of other entities with respect to the positioning sensors. To provide the aforementioned functionality, the positioning sensors may include, for example, optical resonators, optical transceivers, data processors, and/or other types of hardware devices that are able to sense the position, orientation, and/or other telemetry information regarding other photonic sensors in the vicinity of the photonic sensor.

For example, the positioning sensors (204) may (i) emit electromagnetic radiation and measuring the scattering of the electromagnetic radiation and/or (ii) measure electromagnetic radiation emitted by other positioning sensors to identify a distance between the positioning sensors and another entity, a direction with respect to the asset towards another entity, an orientation of the asset with respect to another entity, an orientation of another entity with respect to the asset, and/or other kinds of information describing the relative positioning and orientation of the asset with respect to other entities.

While the asset illustrated in FIG. 2.1 is illustrated as including a single positioning sensor disposed on a single location of the asset, an asset may include any number of positioning sensors disposed on any number of portions at any number of locations on the asset without departing from the invention.

When providing the above noted functionality, the positioning sensors (204) may perform all, or a portion, of the methods illustrated in FIGS. 3-4.2.

In one or more embodiments of the invention, the storage (240) includes devices that provide data storage services (e.g., storing data and providing copies of previously stored data). The devices that provide data storage services may include hardware devices and/or logical devices. For example, the storage (240) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (240) may include a memory device (e.g., a dual in line memory device) in which data is stored and from which copies of previously stored data are provided. In another example, the storage (240) may include a persistent storage device (e.g., a solid state disk drive) in which data is stored and from which copies of previously stored data is provided. In a still further example, the storage (240) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (240) may store data structures including an asset description (242) and sensor data (244). Each of these data structures is discussed below.

The asset description (242) may be a data structure that includes information regarding the hardware, software, information regarding the environment in which the asset resides (e.g., network connectivity information, neighboring devices identified using proximity sensors, identifiers of frames or other structures in which the asset (202) is housed, etc.), and/or other aspects of the asset (202). The asset manager (230) may maintain the asset description (242) as aspects of the asset (202) change due to, for example, hardware, software, and/or changes in the environment proximate to the asset (202). For example, the asset manager (230) may modify the contents of the asset description (242) so that the asset description (242) includes up to date information regarding the asset (202).

The sensor data (244) may be a data structure include any quantity of data obtained from the positioning sensors (204). For example, the sensor data (244) may include data reflecting measurements made by the positioning sensors (204). The sensor data (244) may include any type and quantity of sensor data.

While the storage (240) has been illustrated as including data structures including a limited amount of specific information, any of the data structures stored in the storage (240) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset (202) is illustrated in FIG. 2.2 as including a limited number of specific components, an asset in accordance with embodiments of the invention may include additional, fewer, and/or different components from those illustrated in FIG. 2.2 and/or discussed above without departing from the invention.

As discussed above, the asset mapper (120) of FIG. 1 may generate, maintain, and/or provide asset maps and/or client oriented asset maps. FIG. 2.3 shows a diagram of the asset mapper (120) in accordance with one or more embodiments of the invention.

The asset mapper (120) may provide mapping services for deployments. To provide the aforementioned functionality, the asset mapper (120) may include a map manager (250) and storage (240). Each of these components of the asset mapper (120) is discussed below.

The map manager (250) may be implemented using physical and/or logical devices. For example, the map manager (250) may be implemented using computer readable instructions (e.g., program code) that when executed by the computing resources of the map manager (250) give rise to the functionality of the map manager (250). In another example, the map manager (250) may be implemented using special purpose hardware devices such as, for example, programmable gate arrays, application specific integrated circuit, or another type of hardware device that provides the functionality of the map manager (250) by including circuitry adapted to provide the aforementioned functionality. In a still further example, the map manager (250) may be implemented using a combination of computer readable instructions (e.g., program code) and special purpose hardware devices.

The map manager (250) may provide the mapping services of the asset mapper (120). Mapping services may include (i) generating asset maps (264) using information obtained from assets (e.g., the positions and/or orientation of the assets with respect to each other) of a deployment and asset descriptions (262) and (ii) generating client oriented asset maps (266) using asset maps (264) and information obtained from clients (e.g., the position and/or orientation of a client with respect to at least one asset of a deployment). Such maps may be utilized by client or other entities to more efficiently and/or accurately identify the location of assets within a deployment. The maps may be utilized for other purposes without departing from the invention.

When providing the above noted functionality, the map manager (250) may perform all, or a portion, of the methods illustrated in FIGS. 3-4.2.

In one or more embodiments of the invention, the storage (260) includes devices that provide data storage services (e.g., storing data and providing copies of previously stored data). The devices that provide data storage services may include hardware devices and/or logical devices. For example, the storage (260) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (260) may include a memory device (e.g., a dual in line memory device) in which data is stored and from which copies of previously stored data are provided. In another example, the storage (260) may include a persistent storage device (e.g., a solid state disk drive) in which data is stored and from which copies of previously stored data is provided. In a still further example, the storage (260) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (260) may store data structures including asset descriptions (262), asset maps (264), and client oriented asset maps (266). Each of these data structures is discussed below.

The asset descriptions (262) may be a data structure that includes information regarding the assets of the deployment. For example, asset descriptions (262) may specify that assets that are included in each of the asset collections. In other words, the assets that are included in each of the racks or other organizational structures/asset enclosures of the deployment. The asset descriptions (262) may include additional, different, and/or less information regarding the assets of the deployments without departing from the invention.

The asset descriptions (262) may be implemented as, for example, a table where each row is associated with an asset collection and the columns of the row include identifiers of assets that are disposed in the asset collection associated with the row. The asset descriptions (262) may be maintained, at least in part, by, for example, an administrator, technician, and/or other persons. The asset descriptions (262) may be maintained, at least in part, by, for example, the assets and the map manager (250). For example, the assets may identify other assets operably connected to each other by a networking device of an asset enclosure. Based on the identification, the assets may determine that each of the connected assets is likely to be part of a similar asset collection. The assets may provide such information to the map manager (250) which, in turn, may update the asset descriptions (262) based on the information obtained from the assets.

The assets may provide other types of information to the map manager (250) regarding the likely member of the assets with respect to asset collections without departing from the invention. For example, the assets may utilize sensors to identify other assets that are in close proximity to other assets. Based on the identification, the assets may determine that, due to proximity, the assets are members of asset collections.

The asset maps (264) may be a data structure that includes asset maps of assets of deployments. The asset maps (264) may specify, for example, the relative position, orientation, and/or other information of assets with respect to other assets. The asset maps (264) may specify any amount of such information without departing from the invention.

The client oriented asset maps (266) may be a data structure that includes client oriented asset maps of assets of deployments that are keyed (e.g., oriented with respect to) a location and/or orientation of respective clients. The client oriented asset maps may be dynamically generated. The client oriented asset maps (266) may specify, for example, the relative position, orientation, and/or other information of assets with respect to the position and/or orientation of respective clients. The client oriented asset maps (266) may specify any amount of such information without departing from the invention.

While the storage (260) has been illustrated as including data structures including a limited amount of specific information, any of the data structures stored in the storage (260) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the asset mapper (120) is illustrated in FIG. 2.3 as including a limited number of specific components, an asset mapper in accordance with embodiments of the invention may include additional, fewer, and/or different components from those illustrated in FIG. 2.3 and/or discussed above without departing from the invention.

As discussed above, the client (130) of FIG. 1 may facilitate management of a deployment. FIG. 2.4 shows a diagram of the client (130) in accordance with one or more embodiments of the invention.

As discussed above, the client (130) may provide deployment management services. To provide the aforementioned functionality, the client (130) may include applications (270), positioning sensors (204), a deployment manager (272), and storage (280). Each of these components of the client (130) is discussed below.

The applications (270) may be implemented using physical and/or logical devices. For example, the applications (270) may be implemented using computer readable instructions (e.g., program code) that when executed by the computing resources of the application (270) give rise to the functionality of the applications (270). In another example, the applications (270) may be implemented using special purpose hardware devices such as, for example, programmable gate arrays, application specific integrated circuit, or another type of hardware device that provides the functionality of the applications (270) by including circuitry adapted to provide the aforementioned functionality. In a still further example, the applications (270) may be implemented using a combination of computer readable instructions (e.g., program code) and special purpose hardware devices.

The applications (270) may provide any number of computer implemented services for managing a deployment (and/or providing other types of services). The computer implemented services may include (i) analyzing asset maps and/or client oriented asset maps to identify whether particular assets are present in a deployment, (ii) analyzing asset maps and/or client oriented asset maps to identify whether hardware and/or software components of a deployment should be replaced, updated, or otherwise modified, and/or (iii) other services to facilitate management of deployments. When providing computer implemented services, the applications (270) may generate application data (282) that reflects the services provided by the applications (270).

When the applications (270) provide their functionality, the application (270) and/or other entities may invoke the functionality of the deployment manager (272), discussed below. For example, one or more of the applications (270) may invoke the functionality of the deployment manager (272) may sending a request for a visualization of the deployment. In response, the deployment manager (272) may obtain a client oriented asset map, that is keyed to the location and/or orientation of the client (130), for the deployment and generate a visualization or other representation of the deployment using the client oriented asset map. To do so, the deployment manager (272) may invoke the functionality of the positioning sensors (204) to identify the location and/or orientation of the client (130) with respect to an asset of the deployment. The location and/or orientation of the client (130) may be used in combination with an asset map of the deployment to generate a client oriented asset map.

When providing the above noted functionality, the applications (270) may perform all, or a portion, of the methods illustrated in FIGS. 3-4.2.

The deployment manager (272) may be implemented using physical and/or logical devices. For example, the deployment manager (272) may be implemented using computer readable instructions (e.g., program code) that when executed by the computing resources of the deployment manager (272) give rise to the functionality of the deployment manager (272). In another example, the deployment manager (272) may be implemented using special purpose hardware devices such as, for example, programmable gate arrays, application specific integrated circuit, or another type of hardware device that provides the functionality of the deployment manager (272) by including circuitry adapted to provide the aforementioned functionality. In a still further example, the deployment manager (272) may be implemented using a combination of computer readable instructions (e.g., program code) and special purpose hardware devices.

The deployment manager (272) may provide deployment visualization services. Deployment visualization services may include (i) obtaining and providing sensor data (e.g., location information of the client with respect to one or more assets) from the positioning sensors (204), (ii) obtaining one or more client oriented asset maps (286), associated with respective deployments, that are based, at least in part, on the provided sensor data, and (iii) generating visualizations of deployments using the client oriented asset maps (286). Such visualizations may be utilized by clients or other entities to more efficiently and/or accurately identify the location of assets within a deployment. The maps may be utilized for other purposes without departing from the invention.

When providing the above noted functionality, the deployment manager (272) may perform all, or a portion, of the methods illustrated in FIGS. 3-4.2.

The positioning sensors (204) may be similar to the positioning sensors (204) described with respect to FIG. 2.2. For example, the positioning sensors (204) may generate sensor data (284). The deployment manager (272) may utilize the positioning sensors (204) (e.g., take measurements using the positioning sensors) to identify a relative location and/or orientation of the client (130) with respect to one or more assets of the deployment. The position and/or orientation of the client (130) may be used to define a point of view of client oriented asset maps. In other words, the client oriented asset maps generated using the position and/or orientation of the client (130) may be oriented with respect to the position/orientation.

In one or more embodiments of the invention, the storage (280) includes devices that provide data storage services (e.g., storing data and providing copies of previously stored data). The devices that provide data storage services may include hardware devices and/or logical devices. For example, the storage (280) may include any quantity and/or combination of memory devices (i.e., volatile storage), long term storage devices (i.e., persistent storage), other types of hardware devices that may provide short term and/or long-term data storage services, and/or logical storage devices (e.g., virtual persistent storage/virtual volatile storage).

For example, the storage (280) may include a memory device (e.g., a dual in line memory device) in which data is stored and from which copies of previously stored data are provided. In another example, the storage (280) may include a persistent storage device (e.g., a solid state disk drive) in which data is stored and from which copies of previously stored data is provided. In a still further example, the storage (280) may include (i) a memory device (e.g., a dual in line memory device) in which data is stored and from which copies of previously stored data is provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (280) may store data structures including application data (282), sensor data (284), and client oriented asset maps (286). Each of these data structures is discussed below.

The application data (282) include one or more data structures that include data generated and/or utilized by the applications (270). The application data (282) may include any quantity and/or type of data.

The sensor data (284) may include one or more data structures that include data obtained using the positioning sensors (204). In other words, data regarding the position and/or orientation of the client (130) with respect to an asset of a deployment. The sensor data (284) obtained using the positioning sensors (204) of the client (130) may be used in combination with one or more asset maps to generate one or more of the client oriented asset maps (286).

The client oriented asset maps (286) may include one or more data structures that include client oriented asset maps. As discussed above, a client oriented asset map may specify the location and/or orientation of assets of a deployment with reference to the position and/or orientation of the client (130) with respect to the assets of the deployment. The client oriented asset maps (286) may be utilized by the applications (270) and/or the deployment manager (272) to provide information to a user of the client that may enable the user of the client (130) to more efficiently identify assets of the deployment.

While the storage (280) has been illustrated as including data structures including a limited amount of specific information, any of the data structures stored in the storage (280) may include addition, less, and/or different information without departing from the embodiments of the invention. Further, the aforementioned data structures may be combined, subdivided into any number of data structures, may be stored in other locations (e.g., in a storage hosted by another device), and/or spanned across any number devices without departing from embodiments of the invention. Any of the aforementioned data structures may be implemented using, for example, lists, tables, linked lists, databases, and/or other types of data structures.

While the client (130) is illustrated in FIG. 2.4 as including a limited number of specific components, a client in accordance with embodiments of the invention may include additional, fewer, and/or different components from those illustrated in FIG. 2.4 and/or discussed above without departing from the invention.

As discussed above, the system of FIG. 1 may provide deployment management services. FIGS. 3-4.2 show methods that may be performed by components of the system of FIG. 1 to provide deployment management services.

FIG. 3 shows a flowchart of a method in accordance with one or more embodiments of the invention. The method depicted in FIG. 3 may be used to respond to client oriented location requests in accordance with one or more embodiments of the invention. The method shown in FIG. 3 may be performed by, for example, an asset mapper (e.g., 120, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, a client oriented location request for an asset of a deployment for a client is obtained. The client oriented location request may be a request for information to be provided that may enable the location of the asset of the deployment to be efficiently identified.

In one or more embodiments of the invention, the client oriented location request is a specific request for information specifying the location of a particular asset. In other words, where an asset resides in a deployment.

In one or more embodiments of the invention, the client oriented location request is for a map of assets of the deployment in proximity to a client. For example, a technician, administrator, or other personnel may be near a portion of the deployment and is requesting information that may enable the user of the client to efficiently identify the assets that are proximate to the client.

In step 302, location information of the client with respect to an asset of the deployment is obtained using one or more positioning sensors of the client. The location information may be obtained by invoking the functionality of the positioning sensors of the client. Invoking the functionality of the positioning sensors may, for example, cause the positioning sensors to generate and/or sense electromagnetic radiation in and/or near an optical frequency band. The emitted and sensed electromagnetic radiation may be utilized to estimate a location and/or orientation of an asset nearest to the client.

When emitting and/or sensing electromagnetic radiation, the positioning sensors of the client may cooperate with positioning sensors of the asset. For example, the positioning sensors on each of the aforementioned devices may emit electromagnetic radiation at predetermined times, in predetermined patterns, and/or in other manners adapted to enable the position and/or orientation of the client with respect to the asset to be determined.

After the aforementioned sensor data is obtained, the sensor data may be validated by obtaining similar position and/or orientation information with respect to a second asset that is generally collocated with the asset. For example, the second asset may be part of the same asset collection as the asset from which the first sensor data was obtained. The second asset may be identified based on asset descriptions (262) described with respect to FIG. 2.3.

In step 304, a client oriented asset map is generated using the location information and an asset map of the deployment. The client oriented asset map may be generated by shifting a reference point/orientation of the asset map to position/orient the asset map with respect to the client. For example, the 0, 0 of the asset map may be shifted so that the location of the client is the 0, 0 point. The asset map may also be rotated or otherwise manipulated to orient the asset map with respect to the orientation of the client. By doing so, visualizations of the deployment with respect to the location and/or orientation of the client may be efficient generated by virtue of the client oriented asset map being keyed to the location of the client.

For example, consider a scenario where an asset map is keyed to a component of an asset that is south of the location of the client within the deployment. In such a scenario, the positions of the assets with the respected to the keyed asset may be modified to shift the keyed location to the location of the client.

To generate the client oriented asset map, linear transformations or other tools for mapping the relative locations/orientations of the assets included in the asset map may be applied to the information included in the asset map to generate the client oriented asset map. For example, a linear transformation (e.g., position/orientation transformation) may be generated based on the location information obtained from the client.

In step 306, an action set is performed using the client oriented asset map to service the client oriented location request.

In one or more embodiments of the invention, the action set includes generating and displaying a visualization of the deployment with respect to the position and/or orientation of the client. For example, the visualization may include a representation of asset collections of the deployment (e.g., racks or other structures) and the assets of each of the asset collections (e.g., rack mount chassis housing components) that would be within a field of view of a person having a similar location and/or orientation of the client. For an example of such visualizations, refer to FIGS. 5.6-5.8.

The visualizations may also include, for example, indicators that highlight one or more of the assets and/or indicators of identifiers of the assets. Such information may be used to reduce the cognitive burden on personnel tasked with identifying the assets of the deployment.

The visualizations may be dynamically generated. In other words, the visualizations may change depending on the position and/or orientation of the client. By doing so, the personnel may utilize the client to efficiently scan a deployment for relevant assets.

The visualization may be generated using, for example, one or more client oriented asset maps and/or other information such as a description of assets of a deployment. The description of the assets of the deployment may be utilized to generate a rendering of the asset collections.

For example, the description of the assets may indicate a type of frame, housing, or other structure utilized to house the assets of the asset collection. The type of frame, housing, or other structure may be matched to a library of pre-rendered representations of such frames, housing, or other structures. The pre-rendered representations may be position and/or orientation dependent. Consequently, pre-rendered representations of the frame, housing, or other structures for each potential position and/or orientation of the client (in other words, view angle/view position) with respect to each asset collection may be obtained.

Similarly, the description of the assets may indicate a type of chassis utilized by each of the assets of the asset collection. Pre-rendered representations (similar to those of the frame, housing, or other structure) of the chassis may also be available.

The representations of the asset collections may be generated using the pre-rendered representations of the assets and/or the frames, housing, or other structures used to house the assets of the asset collection. The representations of the asset collections may be used to generate a visualization of the deployment from a point of view of the client.

The visualization of the deployment may be generated via other methods without departing from the invention.

Once rendered, the visualization may be, for example, displayed to a user of a client, provided to an application, or integrated into a graphical user interface of an application. The aforementioned graphical elements may be displayed to the user of the client and/or other users (e.g., personnel disposed at other locations) via displays of the aforementioned devices.

In one or more embodiments of the invention, the visualization is a three dimensional depiction of a portion (or all) of the deployment. The visualization may be a two dimensional depiction of a portion (or all) of the deployment without departing from the invention. For example, the visualization may be a top down view of the deployment and include an icon representing the location of the client within the environment. Additionally, the field of view from the location of the client may indicated in the depiction (e.g., a shaded area or other visual indicator may be used to indicate the field of view).

In one or more embodiments of the invention, the visualization is interactive. For example, the portions of the visualization corresponding to assets may be interacted with by clicking (using, for example, a pointing device such as a mouse), touching (if, for example, the client includes a touch sensitive display), or otherwise selecting using input-output functionality of the client. Upon being interacted with, additional information regarding the corresponding asset may be displayed. For example, a description of a location of the asset within an asset collection (e.g., the second rack from the top, the third rack from the bottom, etc.) may be displayed as a superimposed overlay.

The method may end following step 306.

Using the method illustrated in FIG. 3, a system in accordance with embodiments of the invention may provide information that may enable assets of a deployment to be efficient identified. The information provided may include visualizations of the deployment with additional information that is not present in the deployment. For example, highlights of assets and corresponding identifiers of assets may be provided as part of visualizations of the deployment. The aforementioned highlights and identifiers may not be physically present in the deployment but, when present in the rendering, enable each of the assets of the deployment to be efficiently identified.

As discussed with respect to FIG. 1, the system of FIG. 1 may maintain asset maps of deployment to provide deployment management services. FIGS. 4.2 and 4.3 illustrate methods that may be used to maintain asset maps of deployments.

FIG. 4.1 shows a flowchart of a method in accordance with one or more embodiments of the invention. The method depicted in FIG. 4.1 may be used to maintain an asset map when an asset is added to a deployment in accordance with one or more embodiments of the invention. The method shown in FIG. 4.1 may be performed by, for example, an asset (e.g., 106, FIG. 1). Other components of the system in FIG. 1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a network that includes assets is identified. For example, the network may be a peer to peer network maintained by assets of a deployment. The peer to peer network may, for example, be a gossip network. The network may be other types of networks without departing from the invention.

The network may be identified using communications resources of the asset. For example, the asset may include hardware components such as transceivers adapted to send and receive data via a wireless network. The wireless network may support the network utilized by the assets to communicate with one another.

In step 402, an identity of the asset is provided to the assets of the deployment using the network. For example, the identity may be provided by transmitting the identity to the assets using the network. The identity of the asset may be correlated with an asset description of the deployment.

In step 404, location information with respect to the assets is provided using one or more positioning sensors. The location information may be obtained similarly to that obtained by the client as described with respect to FIG. 3. The location information may also be provided to an asset mapper.

In step 406, an asset map of the deployment is updated based on the location information. The location information may be added to the asset map or used to modify an existing portion of the asset map to update the asset map.

For example, when an asset is moved within the deployment, the asset may be depowered causing the asset to be removed from a network of the deployment. When the asset is powered on or a new asset is added, the asset may automatically join the network which causes the asset to perform the method illustrated in FIG. 4.1.

The asset map may be updated by an asset mapper that provides mapping services for the deployment.

The method may end following step 406.

Using the method illustrated in FIG. 4.1, a system in accordance with embodiments of the invention may maintain an asset map of a deployment as assets are added to or relocated within the deployment.

FIG. 4.2 shows a flowchart of a method in accordance with one or more embodiments of the invention. The method depicted in FIG. 4.2 may be used to maintain an asset map when an asset is added to a deployment in accordance with one or more embodiments of the invention. The method shown in FIG. 4.2 may be performed by, for example, an asset or and asset mapper (e.g., 106, 120, FIG. 1). Other components of the system in FIG. 1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 420, an asset that has joined a network of a deployment is identified. The asset may be identified using an identifier of the asset provided by the asset via the network. For example, the asset may notify other entities on the network of the identity of the asset when the asset joins the network.

In step 422, it is determined whether the asset is a member of the deployment. The determination may be made by comparing the identifier of the asset to a description of the assets of the deployment. In other words, the identifier may be matched to similar identifiers included in the description of the assets of the deployment. If the identifier is matched to an identifier specified by the description of the assets, the asset may be determined as being a member of the deployment. If the identifier does not match any identifier specified by the description of the assets, the asset may be determined as not being a member of the deployment.

The determination may be made via other methods without departing from the invention. For example, a listing of hardware, software, and/or other components of the asset may be matched to similar descriptions of the hardware, software, and/or other components of members of the deployment.

If it is determined that the asset is a member of the deployment, the method may proceed to step 424. If it is determined that the asset is not a member of the deployment, the method may end following step 422. For example, the asset may be kicked of the network or otherwise not allowed to join the deployment following step 422.

In step 424, location information of the asset with respect to other assets of the deployment is obtained using one or more positioning sensors. The location information may be obtained similarly to that obtained by the client as described with respect to FIG. 3. The location information may also be provided to an asset mapper.

In step 426, an asset map of the deployment is updated based on the location information. The location information may be added to the asset map or used to modify an existing portion of the asset map to update the asset map.

The asset map may be updated by an asset mapper that provides mapping services for the deployment.

The method may end following step 4.2.

Using the method illustrated in FIG. 4.2, a system in accordance with embodiments of the invention may maintain an asset map of a deployment as assets are added to or relocated within the deployment.

In addition to the above methods, the system of FIG. 1 may monitor the location of assets within a deployment and maintain a corresponding asset map based on the monitoring. The positioning sensors of the assets may be used to identify changes in the positions and/or orientations of the assets based on changes in sensor data.

For example, when assets are repositioned within the deployment, the signal level of electromagnetic radiation measured by a first positioning sensor when a second positioning sensor radiates electromagnetic radiation. Such changes may cause the system of FIG. 1 to use the sensors to obtain location information to update the asset map.

Similarly, when an asset leaves or otherwise becomes unavailable on a network for a period of time, the system of FIG. 1 may automatically attempt to obtain location information using position sensors of the asset. The asset map may be corresponding updated based on the obtained location information (e.g., if sensor data cannot be obtained because the asset has been removed, the asset may be similarly removed from the asset map).

As the asset map is updated, historical information regarding the asset map may be maintained. For example, the asset map may be implemented using a data structure that includes changes to the asset map. Changes to the asset map may be time stamped or otherwise marked to indicate the periods of time during which the changes to the deployment occurred. Consequently, changes to the deployment and/or the state of the deployment at previous points in time may be identified using the information included in the asset map.

To further clarify embodiments of the invention, a non-limiting example is provided in FIGS. 5.1-5.8. FIG. 5.1 illustrates a system similar to that illustrated in FIG. 1. FIGS. 5.2-5.3 illustrate interactions between components and/or actions performed by the components of the system of FIG. 5.1 over time. FIG. 5.4 illustrates the addition of a client to the system of FIG. 5.1. FIGS. 5.5-5.7 illustrate interactions between components and/or actions performed by the components of the system of FIG. 5.4 over time. FIGS. 5.5-5.8 illustrate generation of visualizations of the system of FIG. 5.4. For the sake of brevity, only a limited number of components of the system of FIG. 1 are illustrated in each of FIGS. 5.1-5.8.

EXAMPLE

Consider a scenario as illustrated in FIG. 5.1 in which a third rack (520) is added to a deployment that includes a first rack (500) and a second rack (510). The first rack (500) includes a first compute unit (502) and a first storage unit (504). The second rack (510) includes a second compute unit (512) and a networking unit (514).

Prior to the addition of the third rack (520), the deployment was used by a leading automotive company to develop new car designs. However, due to the increasing computational cost of generating new car designs, the deployment of FIG. 5.1 was unable to continue to provide effective computer implemented design services to engineers of the automotive company.

To remedy this problem, the third rack (520), which includes a third compute unit (522), is added to the deployment. By adding the third compute unit (522) to the deployment, the deployment is able to provide effective computer implemented services.

Turning to FIGS. 5.2-5.3, the aforementioned figures illustrate interactions and actions between components of the system of FIG. 5.1. In these figures, the relative occurrence in time of the interactions progresses from the top of each figure (i.e., earlier in time) to the bottom of each figure (i.e., later in time). FIG. 5.3 is a continuation of the diagram of FIG. 5.2. In other words, element 530 indicates the first interaction that occurs in time while element 544 indicates the last interaction that occurs.

Turning to FIG. 5.2, at a first point in time, the third compute unit (522) sends a request to join a network (530) utilized by the deployment to the networking unit (514). In response, the networking unit (514) processes the join network request (532). While processing the join network request (532), the networking unit (514) verifies that the third compute unit (522) is a member of the deployment based on an identifier of the third compute unit (522) provided as part of the request to join the network (530).

In this example, because the third compute unit (522) is identified as a member of the deployment, the third compute unit (522) is allowed to join the deployment. Consequently, an update to the asset map of the deployment is triggered.

To update the asset map, the network unit (514), an asset of the deployment, sends a request for location information (534) to the third compute unit. In response to the request for the location information (534), the third compute unit (522) initiates position sensing (536) with respect to the networking unit (514) using positioning sensors of the third compute unit (522) and the network unit (514) to obtain sensor data that specifies the location and/or orientation of the third compute unit (522) with respect to the networking unit (514).

After obtaining the sensor data from the positioning sensors, the third compute unit (522) obtain asset descriptions for the first rack and the second rack (538). The third compute unit (522) identifies that the second compute unit (512) is collocated with the network unit (514) based on the asset descriptions and initiates position sensing (540) with the second compute unit (512) to obtain second sensor data.

After obtaining the sensor data, the third compute unit (522) obtains the location information using the position sensing (542). In this example, the third compute unit (522) compares the sensor data obtained from the position sensing (536, 540) to verify that it is accurate. Specifically, the third compute unit (522) identifies that the sensor data indicates that both the second compute unit (512) and network unit (514) are collocated as indicated by the asset descriptions. Consequently, the third compute unit (522) determines that the sensor data is accurate and uses the sensor data as the location information.

The third compute unit (522) updates the asset map using the location information (544). To do so, the third compute unit (522) provides the location information to an asset mapper (not shown) which updates the asset map using the sensing data.

By performing the above actions, the asset map of the deployment is updated based on location information obtained from the assets of the deployment.

Overtime, the system of FIG. 5.1 is utilized by the automotive company to design additional cars. However, at a second point in time, a processor of the first compute unit (502) is damaged rendering the deployment unable to provide its functionality.

To remedy the situation, a technician is dispatched to the deployment to replace the processor. The technician brings a client (550), as illustrated in FIG. 5.4, to the deployment because the technician is unfamiliar with the assets of the deployment. Consequently, it may be difficult for the technician to identify the first compute unit (502) of the deployment.

Turning to FIGS. 5.5, the aforementioned figure illustrate interactions and actions between components of the system of FIG. 5.4. In this figure, the relative occurrence in time of the interactions progresses from the top of the figure (i.e., earlier in time) to the bottom of the figure (i.e., later in time). In other words, element 560 indicates the first interaction that occurs in time while element 570 indicates the last interaction that occurs.

After the technician enters the deployment, the technician needs to identify the first compute unit (502). To do so, the technician instructs the client (550) to generate a visualization of the deployment from the perspective of the technician which is directly in front of the first rack (500).

To do so, the client (550) initiates position sensing (560) with the nearest asset. In other words, the first compute unit (502). By performing the position sensing (560), sensor data is obtained using position sensors of the client (550) and the first compute unit (502).

After obtaining the sensor data, the client (550) sends an asset map and asset descriptions request (562) to the first storage unit (502). In response, the first compute unit (502) provides the asset map and the asset descriptions (564) for the deployment.

The client (550) utilizes the asset descriptions to identify that the first storage unit (504) is collocated with the first compute unit (502). In response to the identification, the client (550) performs position sensing (566) with the first storage unit (504) to obtain second sensing data. Because sensing data obtained from both position sensing matches (e.g., similar position/orientation), the client (550) determines that the sensor data is accurate and uses the sensor data as location information that specifies the relative position and orientation of the client (550) with respect to the first compute unit (502).

The client (550) next obtains a client oriented asset map using the location information and the asset map (568). To do so, the client (550) provides the aforementioned data to an asset mapper which rekeys the asset map to the position and/or orientation of the client (550).

After obtaining the client oriented asset map, the client (550) generates a visualization of the deployment from the perspective of the technician using the client oriented asset map (570). The visualization is displayed to the technician who uses the technician to identify the first compute unit (502) and replace the processor. By doing so, the deployment is restored and placed in a state usable by designers of the automotive company to design products.

To further clarify the visualization generated by the client (550), diagrams of the visualization (580) as it is successively generated are illustrated in FIGS. 5.6-5.8.

FIG. 5.6 shows a first diagram of the visualization (580). In the first diagram, the client oriented asset map and asset descriptions have been utilized to add pre-rendered racks (572) to the visualizations that include pre-rendered chassis (574) of the assets. In other words, renderings of racks including chassis that reflect the location of the first compute unit (502), first storage unit (504), second compute unit (512), networking unit (514), and the third compute unit (522) are added to the visualization 580.

FIG. 5.7 shows a second diagram of the visualization (580). In the second diagram, the asset descriptions have been utilized to highlight the pre-rendered chassis (574) corresponding to the different assets. In FIG. 5.7, the highlight is show as different fill patterns being superimposed over the different chassis included in the visualization (580).

FIG. 5.8 shows a third diagram of the visualization (580). In the third diagram, names of the assets have been superimposed over portions of the pre-rendered chassis (574) corresponding to the assets. By superimposing the names of the assets (e.g., "First Compute Unit", "First Storage Unit", etc.) and highlighting the different pre-rendered chassis (574), the technician is able to easily identify the location of the first compute unit. Consequently, the technician is able to quickly begin working to replace the processor.

End of Example

Thus, as illustrated in FIGS. 5.1-5.8, embodiments of the invention may provide a method for enabling assets of a deployment to be efficiently identified by a person. For example, by displaying visualizations oriented with respect to a person proximate to the deployment, a cognitive burden placed on the person for interpreting the displayed visualizations may be reduced when compared to displayed visualizations that are not oriented with respect to the person.

Figure 6:
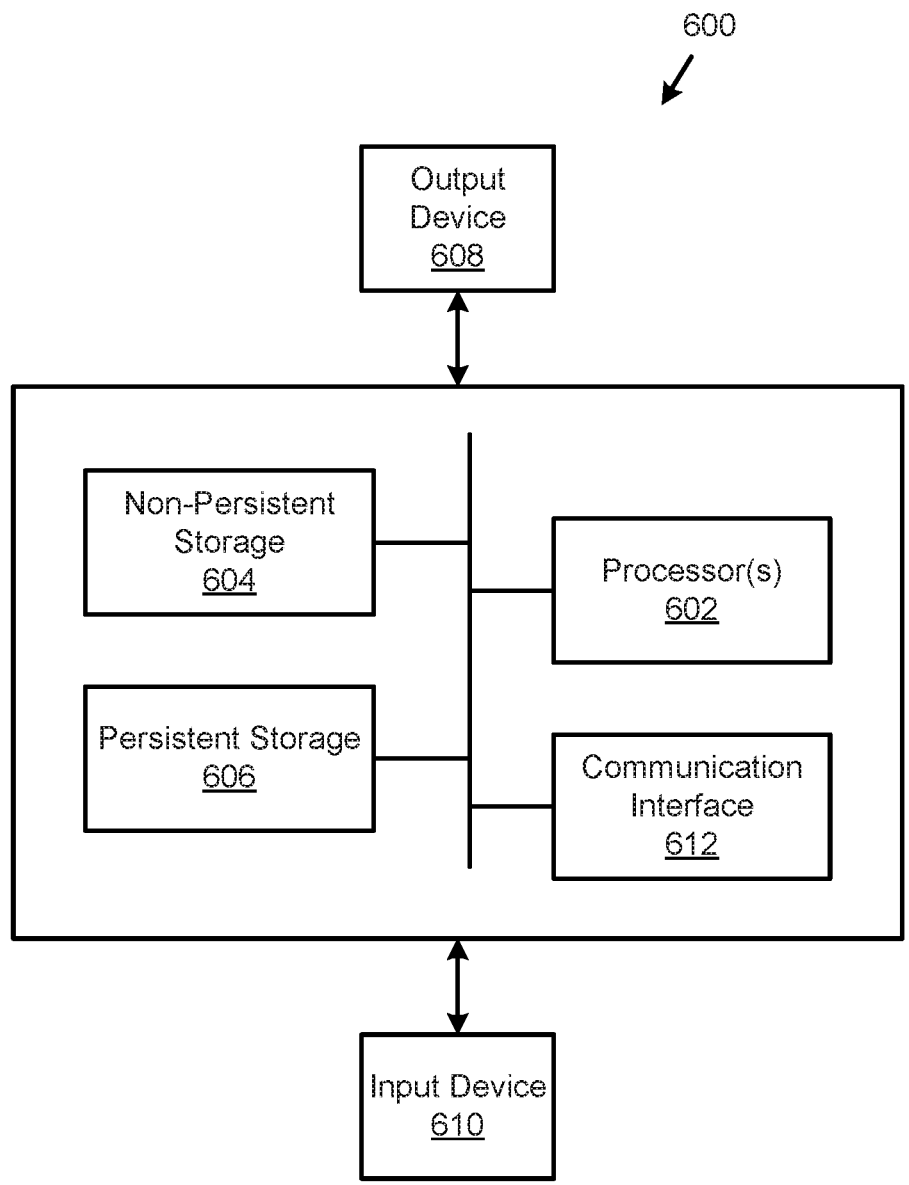
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a method for facilitating the identification of assets in a deployment. To do so, embodiments of the invention may provide a system that obtains location information regarding assets and a client using photonic sensors. By doing so, a map of the assets of the deployment keyed to a location and/or orientation of a client may be generated. The map of the deployment may be used to generate visualizations of the deployment from the view point of a user of the client. The visualizations may be displayed to the user which, in turn, may use the visualizations to identify he location of assets of the deployment Thus, embodiments of the invention may reduce the cognitive burden on a user thereby improving the usability and/or serviceability of a deployment.

Additionally, embodiments of the invention may provide a system that generates map of a deployment without causing interference. For example, by utilizing photonic sensors that operate using electromagnetic radiation outside of the frequency range in which communications are transmitted, location information regarding assets of the deployment may be obtained without radiating electromagnetic radiation near the deployment that may otherwise interfere with communications or other aspects of the operation of the deployment.

Thus, embodiments of the invention may reduce the computing resource cost for generating maps of deployments by reducing interference that may otherwise disrupt the operation of the deployment.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. An asset mapper for managing a deployment, comprising:
   storage for storing an asset map of the deployment; and
   a map manager programmed to:
      obtain a client oriented location request regarding the deployment for a client;
      in response to obtaining the client oriented location request:
         obtain location information and orientation information of the client with respect to an asset of the deployment using a sensor of the client;
         generate a client oriented asset map of the deployment using the location information, the orientation information, and the asset map of the deployment, wherein the client oriented asset map is from a view point defined by the position information and the orientation information; and
         perform an action set using the client oriented asset map to service the client oriented location request,
      wherein the asset mapper is further adapted to generate a visualization of the asset from the view point that corresponds to a field of view of a user of the client,
   wherein the map manager is further programed to:
      prior to obtaining the client oriented location request:
         obtain second location information of the asset with respect to a second asset of the deployment using a second positioning sensor of the asset, wherein the obtaining the second location information further comprises:
            obtaining, using the second positioning sensor, first sensor data that specifies a relative position of the second asset with respect to the asset;
            obtaining, using a third positioning sensor of a third asset of the deployment, second sensor data that specifies a relative position of the third asset with respect to the asset;
            making a determination that the first sensor data and the second sensor data matches a description of locations of the second asset and the third asset; and
            using, based on the determination, the relative position of the second asset with respect to the asset as the second location information; and
         generate the asset map using the second location information.

2. The asset mapper of claim 1, wherein the sensor is adapted to generate sensor data using first electromagnetic radiation in a first frequency band, wherein the asset map is based, at least in part, on data obtained using a network that operates using second electromagnetic radiation in a second frequency band.

3. The asset mapper of claim 2, wherein the first frequency band comprises at least a portion of a visible frequency band that is outside of the second frequency band.

4. The asset mapper of claim 2, wherein the data comprises a relative position of the asset with respect to a second asset of the deployment.

5. A method for managing a deployment, comprising:
   obtaining a client oriented location request regarding the deployment for a client;
   in response to obtaining the client oriented location request:
      obtaining location information and orientation information of the client with respect to an asset of the deployment using a sensor of the client;
      generating a client oriented asset map of the deployment using the location information, the orientation information, and an asset map of the deployment, wherein the client oriented asset map is from a view point defined by the position information and the orientation information;
      performing an action set using the client oriented asset map to service the client oriented location request;
      generating a visualization of the asset from the view point that corresponds to a field of view of a user of the client; and
   prior to obtaining the client oriented location request:
      obtaining second location information of the asset with respect to a second asset of the deployment using a second positioning sensor of the asset, wherein the obtaining the second location information further comprises:
         obtaining, using the second positioning sensor, first sensor data that specifies a relative position of the second asset with respect to the asset;
         obtaining, using a third positioning sensor of a third asset of the deployment, second sensor data that specifies a relative position of the third asset with respect to the asset;
         making a determination that the first sensor data and the second sensor data matches a description of locations of the second asset and the third asset; and
         using, based on the determination, the relative position of the second asset with respect to the asset as the second location information; and generating the asset map using the second location information.

6. The method of claim 5, wherein the sensor generates sensor data using first electromagnetic radiation in a first frequency band, wherein the asset map is based, at least in part, on data obtained using a network that operates using second electromagnetic radiation in a second frequency band.

7. The method of claim 6, wherein the first frequency band comprises at least a portion of a visible frequency band that is outside of the second frequency band.

8. The method of claim 6, wherein the data comprises a relative position of the asset with respect to a second asset of the deployment.

9. A non-transitory computer readable medium comprising computer readable program code, which when executed by a computer processor enables the computer processor to perform a method for managing a deployment, the method comprising:
   obtaining a client oriented location request regarding the deployment for a client;
   in response to obtaining the client oriented location request:
      obtaining location information and orientation information of the client with respect to an asset of the deployment using a sensor of the client;
      generating a client oriented asset map of the deployment using the location information, orientation information, and an asset map of the deployment, wherein the client oriented asset map is from a view point defined by the position information and the orientation information;
      performing an action set using the client oriented asset map to service the client oriented location request;
      generating a visualization of the asset from the view point that corresponds to a field of view of a user of the client; and
   prior to obtaining the client oriented location request:
      obtaining second location information of the asset with respect to a second asset of the deployment using a second positioning sensor of the asset, wherein the obtaining the second location information further comprises:
         obtaining, using the second positioning sensor, first sensor data that specifies a relative position of the second asset with respect to the asset;
         obtaining, using a third positioning sensor of a third asset of the deployment, second sensor data that specifies a relative position of the third asset with respect to the asset;
         making a determination that the first sensor data and the second sensor data matches a description of locations of the second asset and the third asset; and
         using, based on the determination, the relative position of the second asset with respect to the asset as the second location information; and
      generating the asset map using the second location information.

10. The non-transitory computer readable medium of claim 9, wherein the sensor is adapted to generate sensor data using first electromagnetic radiation in a first frequency band, wherein the asset map is based, at least in part, on data obtained using a network that operates using second electromagnetic radiation in a second frequency band.

11. The non-transitory computer readable medium of claim 10, wherein the first frequency band comprises at least a portion of a visible frequency band that is outside of the second frequency band.

* * * * *